US012562469B2

(12) United States Patent
Lalos et al.

(10) Patent No.: US 12,562,469 B2
(45) Date of Patent: *Feb. 24, 2026

(54) VERTICALLY STACKED, INTEGRATABLE, MULTIPURPOSE PLATFORM CONFIGURABLE AS WIRELESS BASE STATIONS

(71) Applicants:Dimitrios Lalos, St. Charles, IL (US); Alex J Lalos, Aurora, IL (US)

(72) Inventors: Dimitrios Lalos, St. Charles, IL (US); Alex J Lalos, Aurora, IL (US)

( * ) Notice: Subject to any disclaimer, the term of this patent is extended or adjusted under 35 U.S.C. 154(b) by 756 days.

This patent is subject to a terminal disclaimer.

(21) Appl. No.: 17/943,947

(22) Filed: Sep. 13, 2022

(65) Prior Publication Data

US 2023/0146405 A1     May 11, 2023

Related U.S. Application Data

(63) Continuation-in-part of application No. 17/337,754, filed on Jun. 3, 2021, now Pat. No. 11,532,876, which
(Continued)

(51) Int. Cl.
| | |
|---|---|
| *H04W 88/08* | (2009.01) |
| *F21S 9/02* | (2006.01) |
(Continued)

(52) U.S. Cl.
CPC ................ *H01Q 1/44* (2013.01); *F21S 9/02* (2013.01); *G06F 3/041* (2013.01); *G06F 3/1446* (2013.01);
(Continued)

(58) Field of Classification Search
CPC .......... H01Q 1/44; H01Q 1/1242; H01Q 1/42; H01Q 1/246; F21S 9/02; G06F 3/041;
(Continued)

(56) References Cited

U.S. PATENT DOCUMENTS

| | | | |
|---|---|---|---|
| 9,113,293 B1* | 8/2015 | Rayburn | H04W 64/00 |
| 2017/0279187 A1* | 9/2017 | Lockwood | H01Q 1/42 |

FOREIGN PATENT DOCUMENTS

CN      208862145 U  *  5/2019

* cited by examiner

*Primary Examiner* — Said M Elnoubi
(74) *Attorney, Agent, or Firm* — Erickson Law Group, PC

(57) ABSTRACT

An apparatus includes a support frame including lower frame section, at least one intermediate frame section, and an upper frame section. The lower frame section may define a structure-free interior compartment which may contain or house one or more electronics modules. The at least one intermediate frame section may define a structure-free interior compartment which may contain or house one or more electronics modules. The upper frame section may include an upper frame horizontal shelf, a central post coupled with and extending vertically upward from the upper frame horizontal shelf, a top cover coupled with the central post, and one or more peripheral members extending between the upper frame horizontal shelf and the top cover, the upper frame section defining an upper structure-free interior region extending between the central post and the one or more peripheral members. One or more antennas may be adjustably mounted on the central post.

21 Claims, 21 Drawing Sheets

Related U.S. Application Data is a continuation of application No. 16/354,971, filed on Mar. 15, 2019, now Pat. No. 11,075,454.

(60) Provisional application No. 63/243,467, filed on Sep. 13, 2021, provisional application No. 62/643,441, filed on Mar. 15, 2018.

(51) Int. Cl.

| | |
|---|---|
| *G06F 3/041* | (2006.01) |
| *G06F 3/14* | (2006.01) |
| *G06Q 20/18* | (2012.01) |
| *G06V 20/52* | (2022.01) |
| *H01Q 1/12* | (2006.01) |
| *H01Q 1/42* | (2006.01) |
| *H01Q 1/44* | (2006.01) |

(52) U.S. Cl.
CPC ............. *G06Q 20/18* (2013.01); *G06V 20/52* (2022.01); *H01Q 1/1242* (2013.01); *H01Q 1/42* (2013.01); *H04W 88/08* (2013.01)

(58) Field of Classification Search
CPC ...... G06F 3/1446; G06Q 20/18; G06V 20/52; H04W 88/08; G09F 15/005; G09F 27/00
See application file for complete search history.

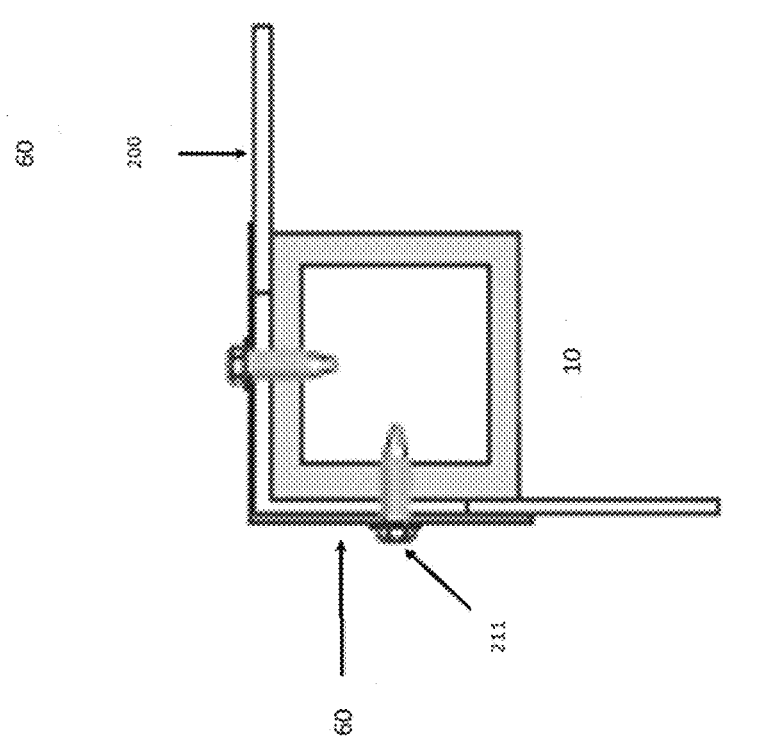
Fig. 9B
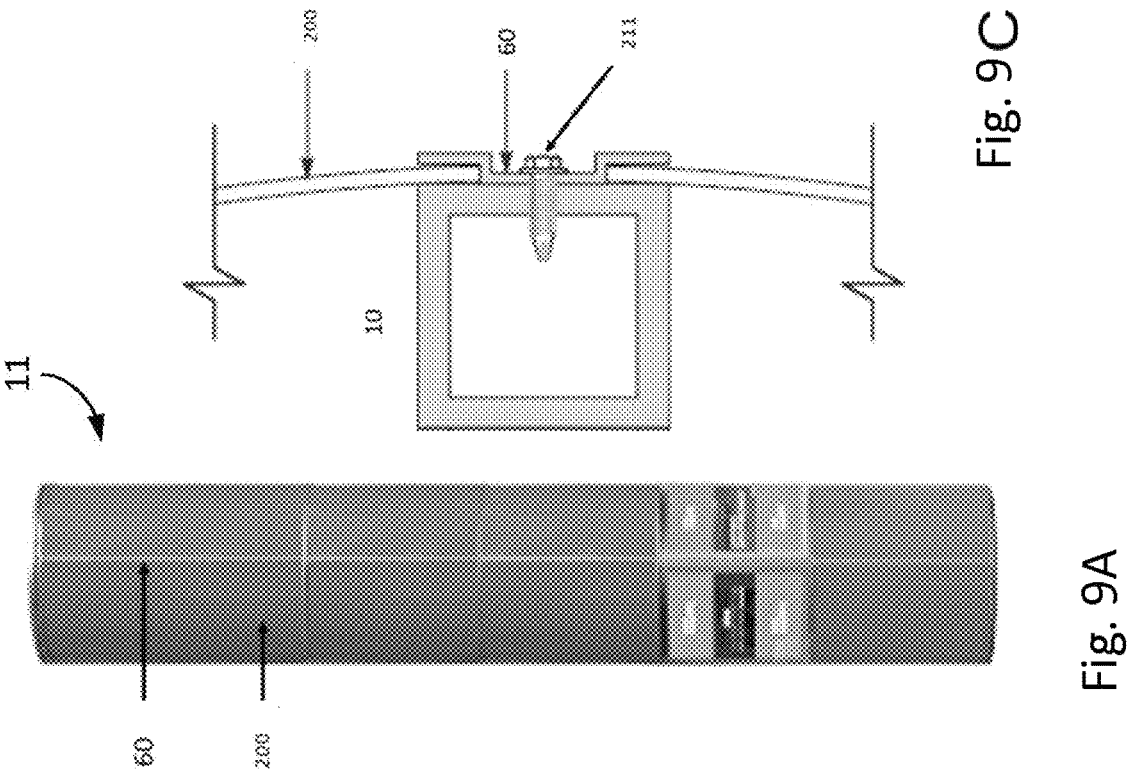
Fig. 9C
Fig. 9A

VERTICALLY STACKED, INTEGRATABLE, MULTIPURPOSE PLATFORM CONFIGURABLE AS WIRELESS BASE STATIONS

This application claims the benefit of U.S. provisional application Ser. No. 63/243,467, filed Sep. 13, 2021 and is a continuation-in-part of U.S. application Ser. No. 17/337, 754, filed Jun. 3, 2021 which is a continuation of U.S. Ser. No. 16/354,971 filed Mar. 15, 2019 which claims the benefit of U.S. provisional application Ser. No. 62/643,441 filed Mar. 15, 2018.

TECHNICAL FIELD

The present application relates to vertically stacked, integratable, multipurpose platform configurable as wireless base stations and apparatuses, methods, systems, and techniques relating thereto including, but not exclusive to apparatuses, methods, systems, and techniques relating to LTE, 5G wireless or future technologies and edge computing micro-base stations.

BACKGROUND

Wireless communications infrastructure, networks, and services are progressing toward 5G wireless standards and technologies. As part of this development, wireless base stations may be deployed at the street level utilizing existing infrastructure, such as utility poles or street light structures, or their own dedicated poles or structures to provide LTE or 5G cellular coverage. These deployments require pole space or other mounting space to implement and typically lack battery backup power. Such deployments are also limited in radio frequency (RF) power and capacity to process multiple users, resulting in undesirable coverage limitations. Conventional efforts to compensate for these limitations add antennas and RF equipment making such deployments bulky, wasteful of footprint space, and aesthetically unpleasant. Use of existing infrastructure, such as street lights, requires retrofitting new equipment and/or installing new poles to withstand the additional equipment weight. This is an expensive and time-consuming process, requiring ad hoc solutions to accommodate the variation in existing infrastructure. At the same time, upcoming "smart city" deployments such as interactive kiosks, surveillance cameras and sensors necessitate additional space and resources. Current deployments typically require stand-alone platforms used to convey information via kiosks placed in locations of heavy foot traffic such as community centers, bus or train stations, malls, or other commercial locations and have limited if any radio coverage as the height and connectivity provided by such deployments are limited. There remains a substantial unmet need for the unique apparatuses, methods, and systems disclosed herein.

DISCLOSURE OF EXAMPLE EMBODIMENTS

For the purposes of clearly, concisely, and exactly describing example embodiments of the present disclosure, the manner, and process of making and using the same, and to enable the practice, making, and use of the same, reference will now be made to certain example embodiments, including those illustrated in the figures, and specific language will be used to describe the same. It shall nevertheless be understood that no limitation of the scope of the invention is thereby created and that the invention includes and protects such alterations, modifications, and further applications of the example embodiments as would occur to one skilled in the art with the benefit of the present disclosure.

BRIEF DESCRIPTION OF THE FIGURES

A number of example embodiment illustrating certain aspects of vertically stacked, integratable, multipurpose platforms which are configurable as wireless base stations and which may be referred to herein as a tower or towers are illustrated in the figures in which:

FIGS. 9A-9C are several views illustrating certain aspects of example panel attachment systems useable in connection with a support frame of a tower according to the present disclosure.

DETAILED DESCRIPTION OF EXAMPLE EMBODIMENTS

This application incorporates by reference U.S. provisional application Ser. No. 63/243,467, filed Sep. 13, 2021; U.S. application Ser. No. 17/337,754, filed Jun. 3, 2021; U.S. application Ser. No. 16/354,971 filed Mar. 15, 2019; and US provisional application Ser.r. no 62/643,441 filed Mar. 15, 2018.

Figure 1:
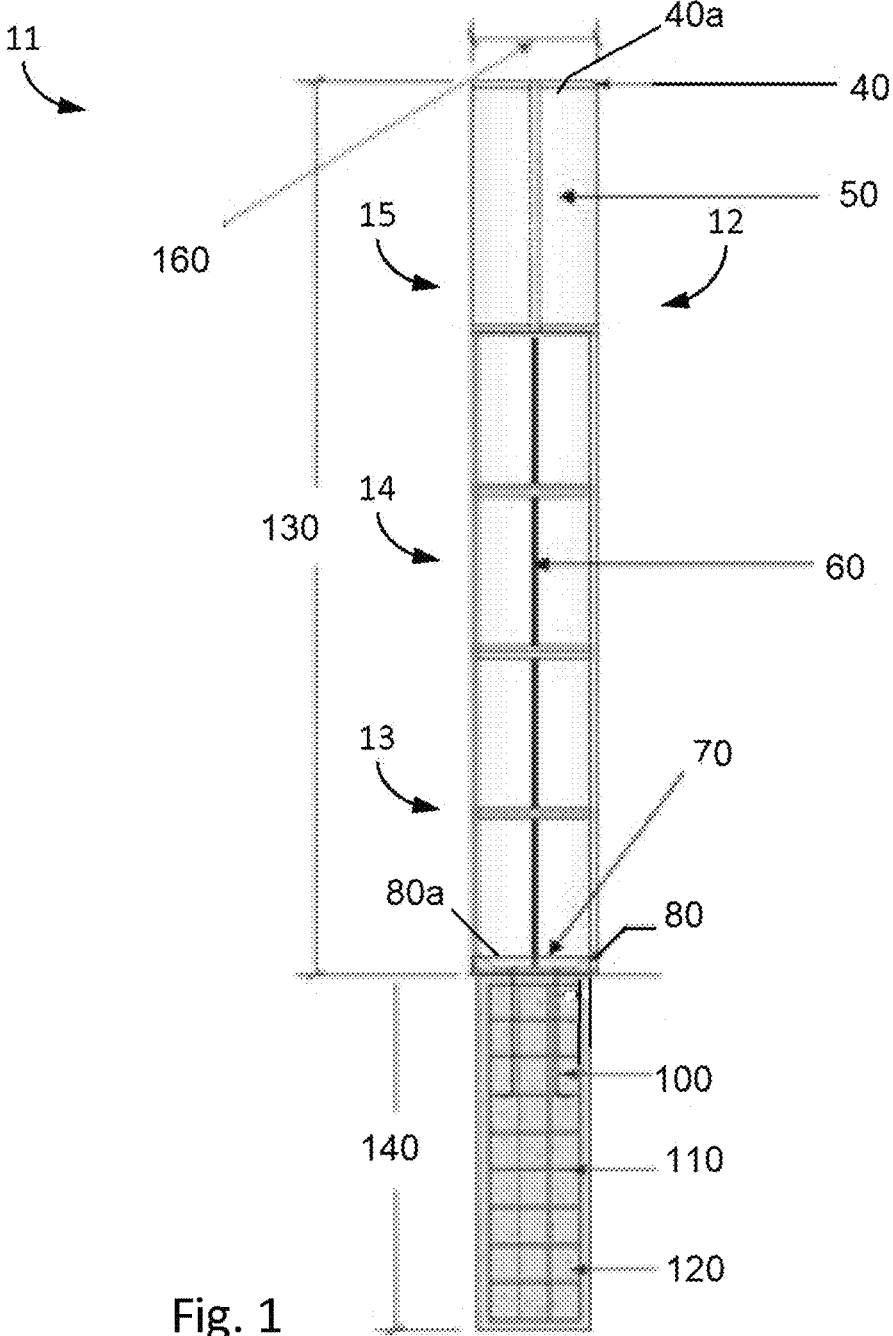
FIG. 1 is a side sectional view illustrating certain aspects of an example tower in an unloaded or substantially empty state.

Referring now to the figures and with initial reference to FIG. 1, there is illustrated a wireless base station tower 11 (also referred to herein as tower 11) in an unloaded or substantially empty state in which the internal electronic equipment and other components that may be contained or housed within the tower 11 are omitted. In the illustrated embodiment, the tower 11 is configured and provided as a freestanding structure mounted on and extending vertically upward from a foundation 120 by a fixation system 70 to a height 130 and extending over a diameter or width 160. The tower 11 includes a base plate 80 which is affixed to the anchor bolts 100 (e.g., J-bolts or other fasteners) at a spaced-apart location above the upper surface of the foundation. The tower 11 may be freestanding or self-supporting such that the only ground anchoring connections of the support frame are provided via a first plurality of apertures of a base plate 80 which receive the anchor bolts 100.

The height 130 can advantageously be between 20 and 65 feet, but other heights are also encompassed by the invention.

As further illustrated in FIG. 1, the foundation 120 extends into an underlying ground surface to a depth 140 which is selected to provide sufficient anchoring to securely support the mass of the tower 11 taking into consideration wind and other environmental forces which the tower 11 may be rated to withstand. The depth 140 may vary depending on variables such as the mass, shape, and wind force rating of different forms of the tower 11. In the illustrated embodiment the foundation 120 is formed of concrete reinforced with a rebar cage 110 and includes J-bolts 100 or other fasteners partially embedded in and extending from the upper surface 199 of the foundation 120. Leveling nuts 192 can be provided on the bolts 100.

Figure 7:
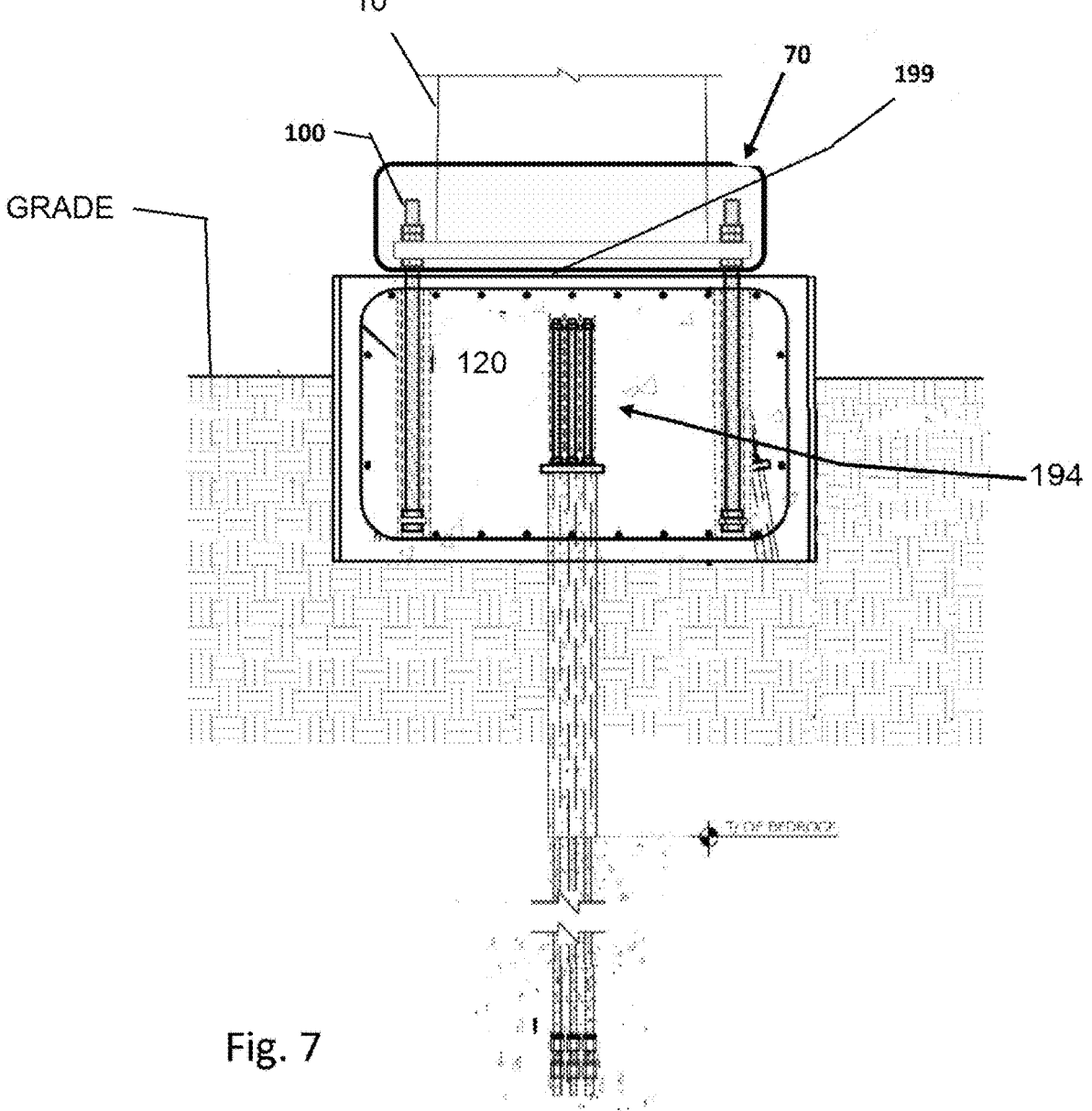
FIGS. 7 and 7A are side sectional views illustrating certain aspects of an anchoring foundation useable in connection with a support frame of a tower according to the present disclosure.
Figure 7A:
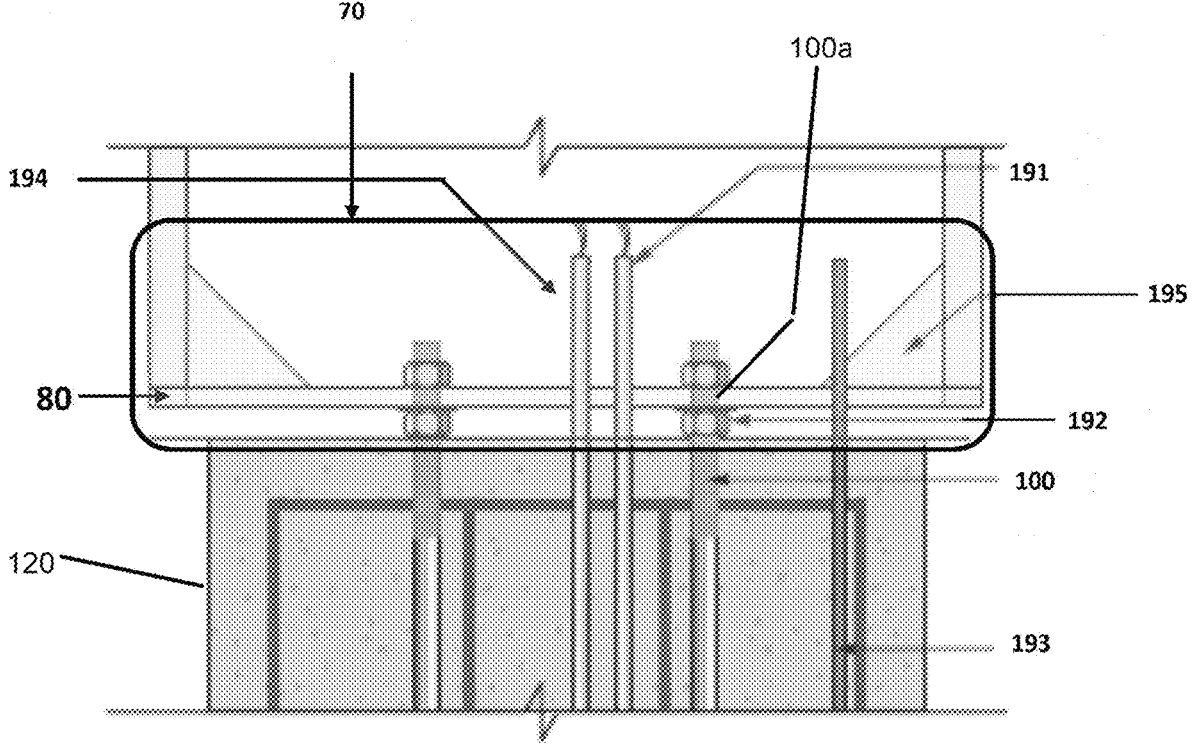

As further shown in FIGS. 7 and 7A, one or more telecommunications feeds 194, electrical power feeds 191, and electrical grounding rods or conductors 193 may extend from the foundation 120 through the base plate 80 to the interior of the tower 11. It shall be appreciated that the foundation 120 may be provided in a number of other configurations, forms, and variations providing sufficient anchoring force to accommodate different configurations, forms, and variations of the tower 11. One or more air inlet apertures 80a are provided in the base plate 80 to provide an air intake 80a at the bottom of the tower 11 mounted over base plate 80.

Figure 8:
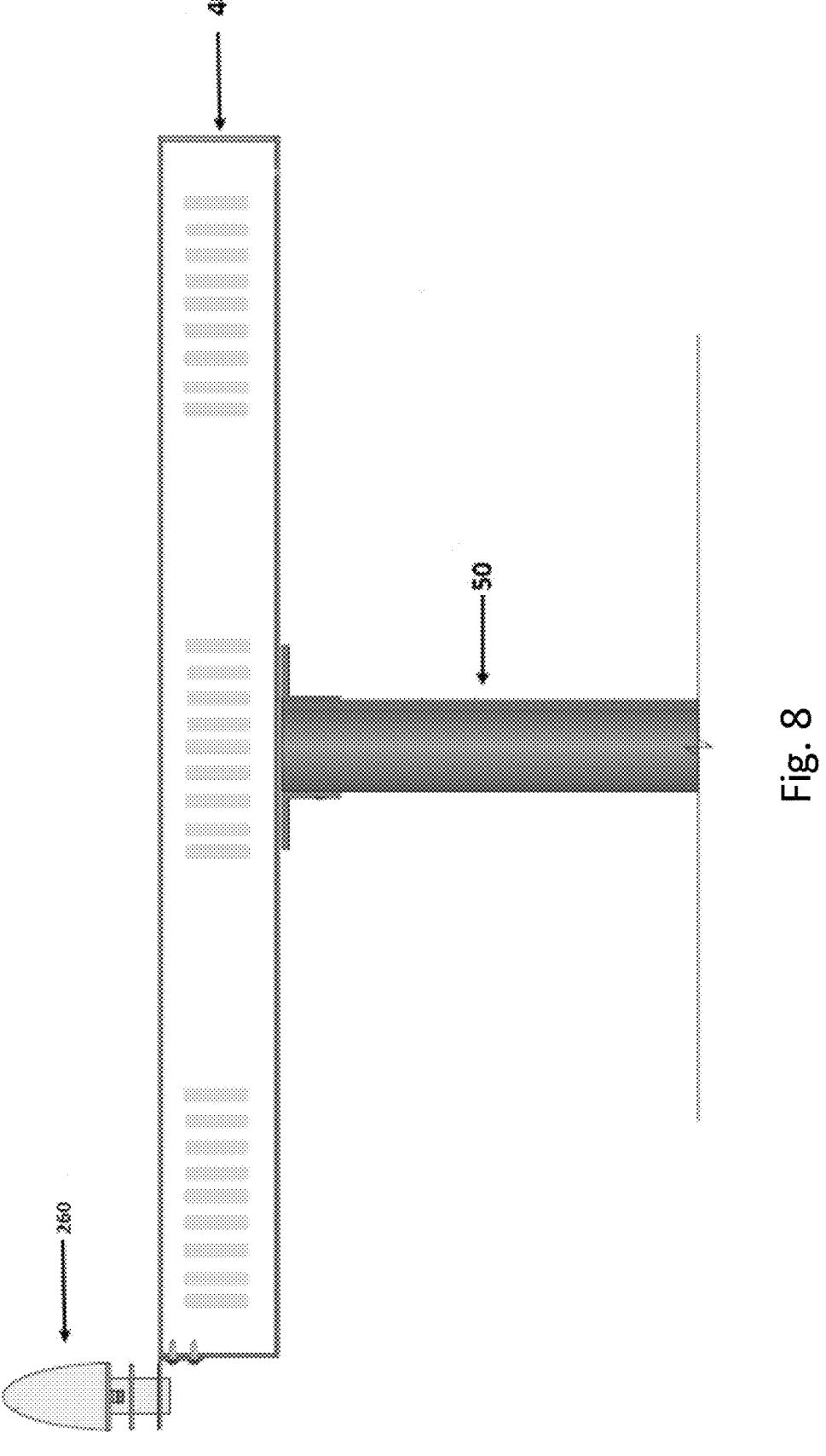
FIG. 8 is a side view illustrating certain aspects of a top portion of a support frame of a tower according to the present disclosure.

As further illustrated in FIG. 8, the upper frame section 15 of the tower 11 contains an antenna mounted pole 50 bolted and/or welded to a top plate. The upper frame section 15 may be capped with a top cover assembly 40 including one or more exhaust ports 40a to allow air to be drawn in from the air intake at the bottom of the tower 11 and to exit from the upper region of tower 11. The upper frame section 15 may also include one or more horizontal shelves including one or more vent apertures at a peripheral location of the upper frame horizontal shelves. A GPS antenna 260 may be affixed to the top cover assembly 40 and may be utilized to assist all electronic equipment with timing requirements.

With additional reference to FIGS. 1, 2A, 2B, 3A, 3B, and 16, the tower 11 includes a support frame 12 comprising a lower frame section 13, at least one intermediate frame section 14 positioned vertically above and supported by the lower frame section 13, and an upper frame section 15 positioned vertically above and supported by the at least one intermediate frame section 14. The lower frame section 13 may define one or more lower structure-free interior compartments horizontally spanning the lower frame section 13. In the illustrated example, the lower frame section 13 defines two lower structure-free interior compartments 23a, 23b horizontally spanning the lower frame section 13. In other embodiments, the lower frame section 13 may be configured to define a single lower structure-free interior compartments, or more than two lower structure-free interior compartments.

In the illustrated embodiment, the lower frame section 13 comprises a frame scaffolding 10 including a plurality of vertical columns 33 and a plurality of horizontal beams 43 coupled with and extending between respective ones of the plurality of vertical columns 33. A plurality of horizontal shelves 190 are supported by respective sets of one or more of the plurality of horizontal beams 43 and extend between the plurality of vertical columns 33. The structure-free interior compartments 23a, 23b are bordered by and extend horizontally between the plurality of vertical columns 33 and vertically between opposing sets of the plurality of horizontal beams 43. The plurality of horizontal shelves 190 and the plurality of horizontal beams 43 may be selectably positionable at a plurality of vertical fixation locations along the height of the plurality of vertical columns 33.

The lower frame section comprises a base plate 80 supporting the plurality of vertical columns 33, the plurality of horizontal beams 43, and the plurality of horizontal shelves 190. As further illustrated in FIGS. 7, and 7A, the base plate 80 can include a plurality of ventilation apertures 80*a* which register with at least the lowest most vents 115, 116 of the shelves, mounting holes 100*a* sized and positioned to receive ground anchor bolts, and one or more second apertures sized and positioned to receive one or both of an electrical power cable or electrical feed 191 and a network communication line or telecom feed 194. One or more gussets 195 may be provided to reinforce the attachment between the base plate 80 and vertically extending structures of the tower 11.

The tower 11 can be configured such that the baseplate 80 functions as the lowermost shelf, or can be configured such that a lowermost shelf 190, 190*a* overlies the baseplate 80.

The intermediate frame section 14 defines at least one intermediate structure-free interior compartment. In the illustrated example, the intermediate frame section 14 defines two lower structure-free interior compartments 24*a*, 24*b* horizontally spanning the intermediate frame section 14. In other embodiments, the intermediate frame section 14 may be configured to define a single intermediate structure-free interior compartment, or more than two intermediate structure-free interior compartments. In the illustrated example, the intermediate frame section 14 is provided as a single intermediate frame section. In other embodiments, the intermediate frame section 14 may comprise two or more intermediate frame sections which may be coupled with one another.

In the illustrated embodiment, the intermediate frame section 14 comprises a frame scaffolding including a plurality of vertical columns 34 and a plurality of horizontal beams 44 coupled with and extending between respective ones of the plurality of vertical columns 34. A plurality of horizontal shelves 190 are supported by respective sets of one or more of the plurality of horizontal beams 44 and extend between the plurality of vertical columns 34. The structure-free interior compartments 24*a*, 24*b* are bordered by and extend horizontally between the plurality of vertical columns 34 and vertically between opposing sets of the plurality of horizontal beams 44. The plurality of horizontal shelves 190 and the plurality of horizontal beams 44 may be selectably positionable at a plurality of vertical fixation locations along the height of the plurality of vertical columns 34. It shall also be appreciated that other embodiments contemplate different numbers, positioning, alignments, and orientations of frame scaffolding members.

As further illustrated in FIGS. 16A-16D, panel retaining members 33', 43' may be coupled with the vertical columns 33, 34. Panel retaining members 43', 44' may be coupled with the horizontal beams 43, 44 by fasteners 111. Fasteners 111 may be provided in a form compatible with or requiring use of a keyed installation to provide a security barrier against removal of the exterior panels 240, 241. Exterior panels 240, 241 may be disposed therebetween and may be retained by panel retaining members 33', 43' and panel retaining members 43', 44' by fasteners 111. A seal or gasket 242 may be provided adjacent the exterior panels 240, 241. The fasteners 111 may be provided as keyed fasteners, such as keyed bolts or keyed screws, to provide a security locking mechanism providing tamper resistance and for the interior of the tower 11. It shall be appreciated that the embodiment of FIGS. 16A-16D provides one example of attachment or fixation of exterior panels with a tower such as the tower 11. Other embodiment may include one or more of a plurality of solid exterior panels being coupled with the support frame by a hinge accommodating opening to provide access to at least one of the lower structure-free interior compartments and the intermediate structure-free interior compartments.

In the illustrated example, the plurality of vertical columns 33 comprises four vertical columns arranged such that an inward facing surface of each of the four vertical columns intersects a respective corner of a rectangle with sides extending between respective pairs of the four vertical columns. It shall also be appreciated that other embodiments contemplate different numbers, positioning, alignments, and orientations of frame scaffolding members.

Figure 4:
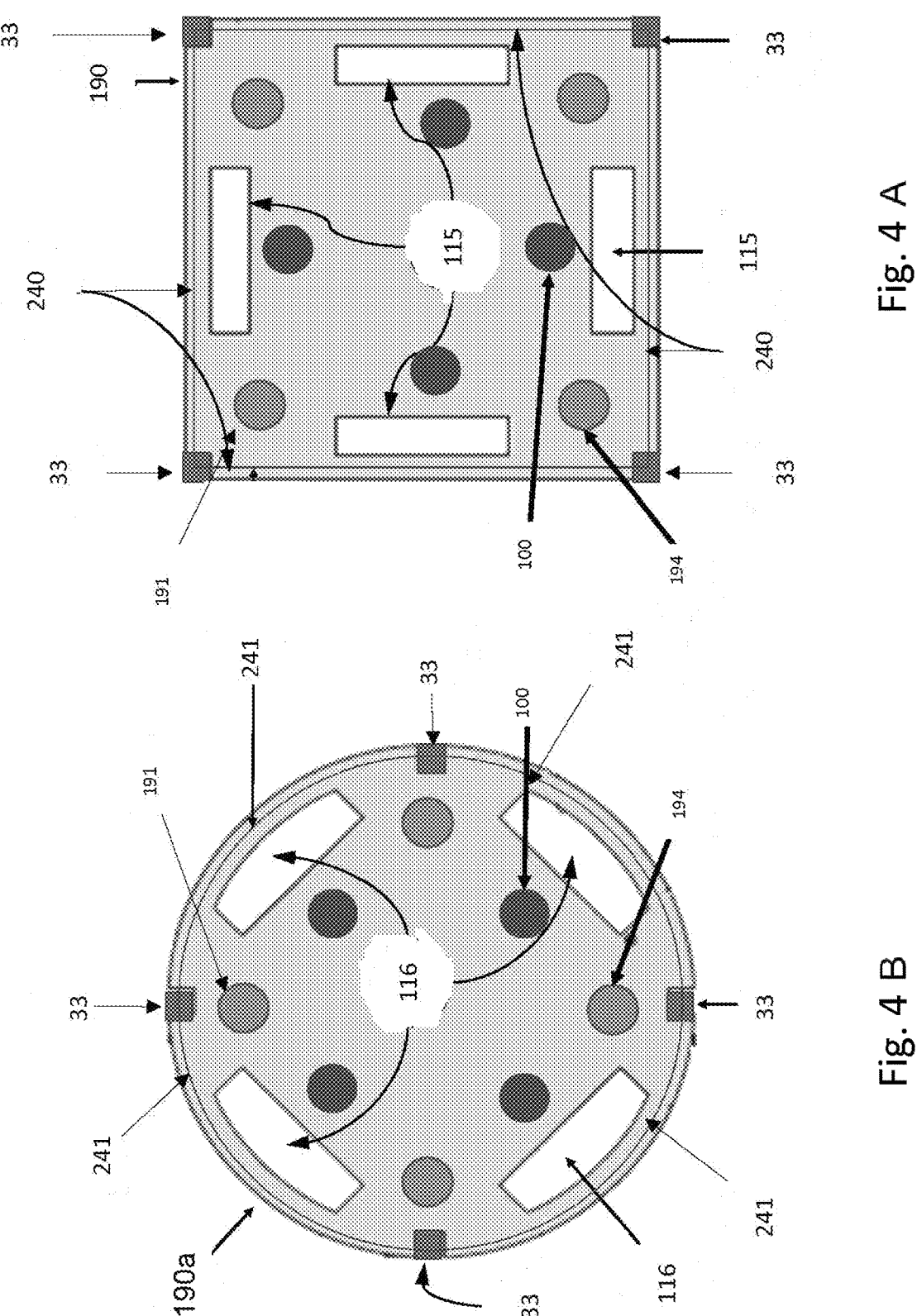
FIG. 4A is a top view illustrating certain aspects of a support frame of a tower according to the present disclosure.
FIG. 4B is a top view illustrating certain aspects of another support frame of a tower according to the present disclosure.
Figure 5:
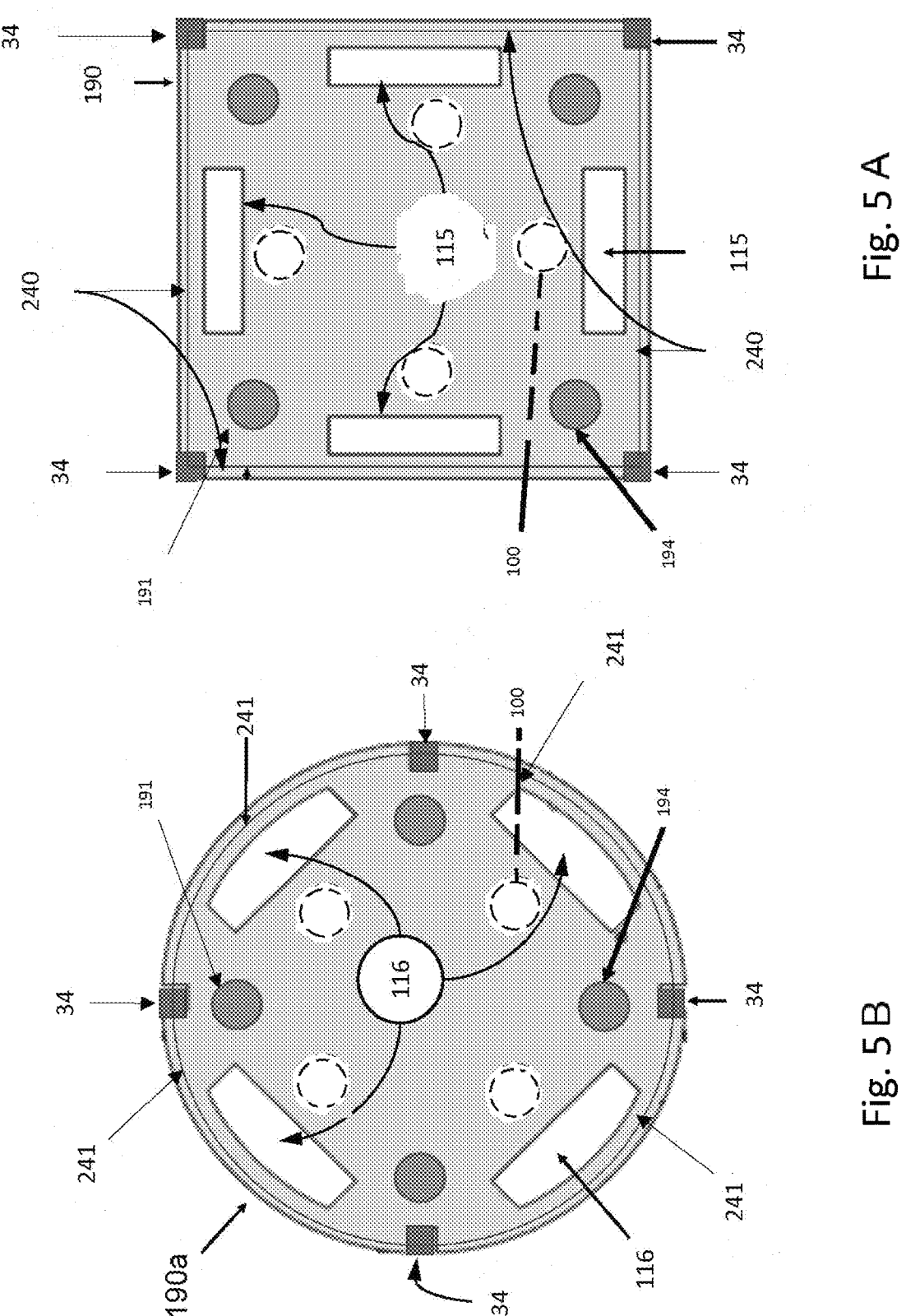
FIG. 5A is a top view illustrating certain aspects of a support frame of a tower according to the present disclosure.
FIG. 5B is a top view illustrating certain aspects of another support frame of a tower according to the present disclosure.

As illustrated in FIGS. 4A and 5A, the horizontal shelves may be generally square or rectangular horizontal shelves 190 and the plurality of vertical columns 33, 34 may be aligned, oriented and positioned to maximize or increase the internal space within the frame scaffolding 10. For example, the plurality of vertical columns 33, 34 may be oriented such that a first major surface of the each of the plurality of vertical columns 33, 34 is oriented to face a first major surface of another of the plurality of vertical columns 33, 34 and a second major surface of the each of the plurality of vertical columns 33, 34 is oriented to face a second major surface of another of the plurality of vertical columns 33, 34. Furthermore, the plurality of vertical columns 33, 34 may be oriented such that a first of two surfaces of a first one of the first plurality of vertical columns is parallel with and face a surface of a second one of the first plurality of vertical columns and a second of the two surfaces of the first one of the first plurality of vertical columns is parallel with and face a surface of a second one of the first plurality of vertical columns. A plurality of generally flat exterior panels 240 may extend between opposing major faces of pairs of the plurality of vertical columns 33, 34. Vent apertures 115 may be provided inside and proximate the boundary or border provided by the panels 240.

As illustrated in FIGS. 4B and 5B, the horizontal shelves may also be generally circular or rounded horizontal shelves 190*a* and the plurality of vertical columns 33, 34 may be aligned, oriented and positioned to maximize or increase the internal space within the frame scaffolding 10. For example, the plurality of vertical columns 33, 34 may be oriented such that a first major surface of the each of the plurality of vertical columns 33, 34 is oriented to face a first major surface of another of the plurality of vertical columns 33, 34 positioned generally across the diameter of the generally circular or rounded horizontal shelves 190*a*. Furthermore, the plurality of vertical columns 33, 34 may be oriented such that the inward facing surface of a first one of the first plurality of vertical columns is parallel with and faces the inward facing surface of a second one of the first plurality of vertical columns, and the inward facing surface of a third one of the first plurality of vertical columns is parallel with and faces the inward facing surface of a fourth one of the first plurality of vertical columns. A plurality of curved exterior panels 241 may extend between opposing major faces of pairs of the plurality of vertical columns 33, 34. Vent apertures 115 may be provided inside and proximate the boundary or border provided by the panels 241.

The illustrated embodiments provide examples of a lower frame section 13 comprising a polygonal frame module including a first plurality of open-aperture faces 30 providing unobstructed access to a lower structure-free interior compartment which may be selectably and removably covered with exterior panels and an intermediate frame section comprising a polygonal frame module including a plurality of open-aperture faces providing unobstructed access to an intermediate structure-free interior compartment which may be selectably and removably covered with exterior panels.

Such access may be provided around substantially the entire exterior of the lower frame section 13 and the intermediate frame section 14, for example, from each of four exterior faces of the tower 11 in the illustrated embodiment. It shall also be appreciated that other embodiments contemplate different numbers, positioning, alignments, and orientations of frame scaffolding members and different resulting in different numbers, positioning, alignments, and orientations of open-aperture faces providing unobstructed access to an intermediate structure-free interior compartment which may be selectably and removably covered with exterior panels.

The lower frame section 13 and the intermediate frame section 14 may be provided, coupled, or fastened to one another in a number of manners. For example, the lower frame section 13 and the intermediate frame section 14 may each comprise a first polygonal frame module and at least one second polygonal frame module may be provided as discrete structures configured to selectably and reversibly fasten and unfasten from one another. Alternatively, each of the lower frame section 13 and the intermediate frame section 14 may be provided as a single or common discrete structure. Furthermore, the lower frame section 13 and the intermediate frame section 14 may respectively comprise a first polygonal frame module and a second polygonal frame module provided as discrete structures configured to selectably and reversibly fasten and unfasten from one another. Alternatively, the lower frame section 13 and the intermediate frame section 14 may be provided as a single or common discrete structure. In some embodiments a plurality of intermediate frame sections 14 may be provided.

Figures 2A, 2B:
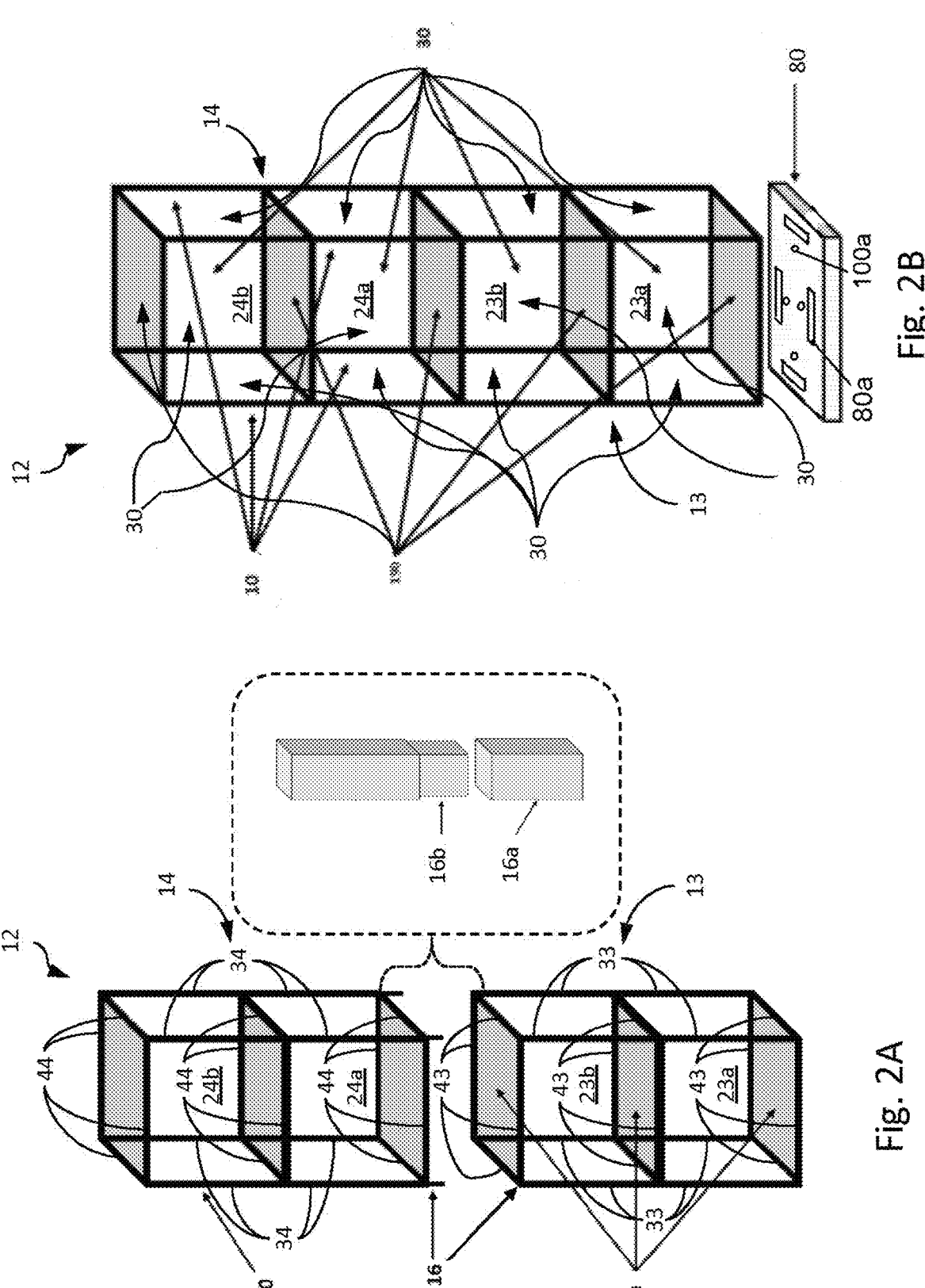
FIGS. 2A and 2B are perspective views illustrating certain aspects of a support frame of a tower according to the present disclosure at different stages of assembly.

As illustrated in FIG. 2A, the lower frame section and the intermediate frame section may respectively comprise a female mating structure 16a and a male mating structure 16b as part of facing ends of the vertical columns. In some embodiment, the lower frame section and the intermediate frame section may be welded to one another. In some embodiment, the lower frame section and the intermediate frame section may be coupled with one another by strength-bearing screws. In some embodiments, a combination of two or more of the foregoing attachment, coupling, or fixation techniques may be used.

With additional reference to FIGS. 3A and 3B and 17-20, the upper frame section 15 includes an upper frame horizontal shelf 55, and a central post 50 (also referred to as antenna mounting pole 50) coupled with the upper frame horizontal shelf 55 by a lower flange 52 and extending vertically upward from the upper frame horizontal shelf 55. A top cover assembly 40 is coupled with the central post 50 by an upper flange 51. One or more peripheral members extend between the upper frame horizontal shelf 55 and the top cover assembly 40. The upper frame section 15 defines an upper structure-free interior region 25 extending between the central post 50 and the one or more peripheral members.

Figures 3A, 3B:
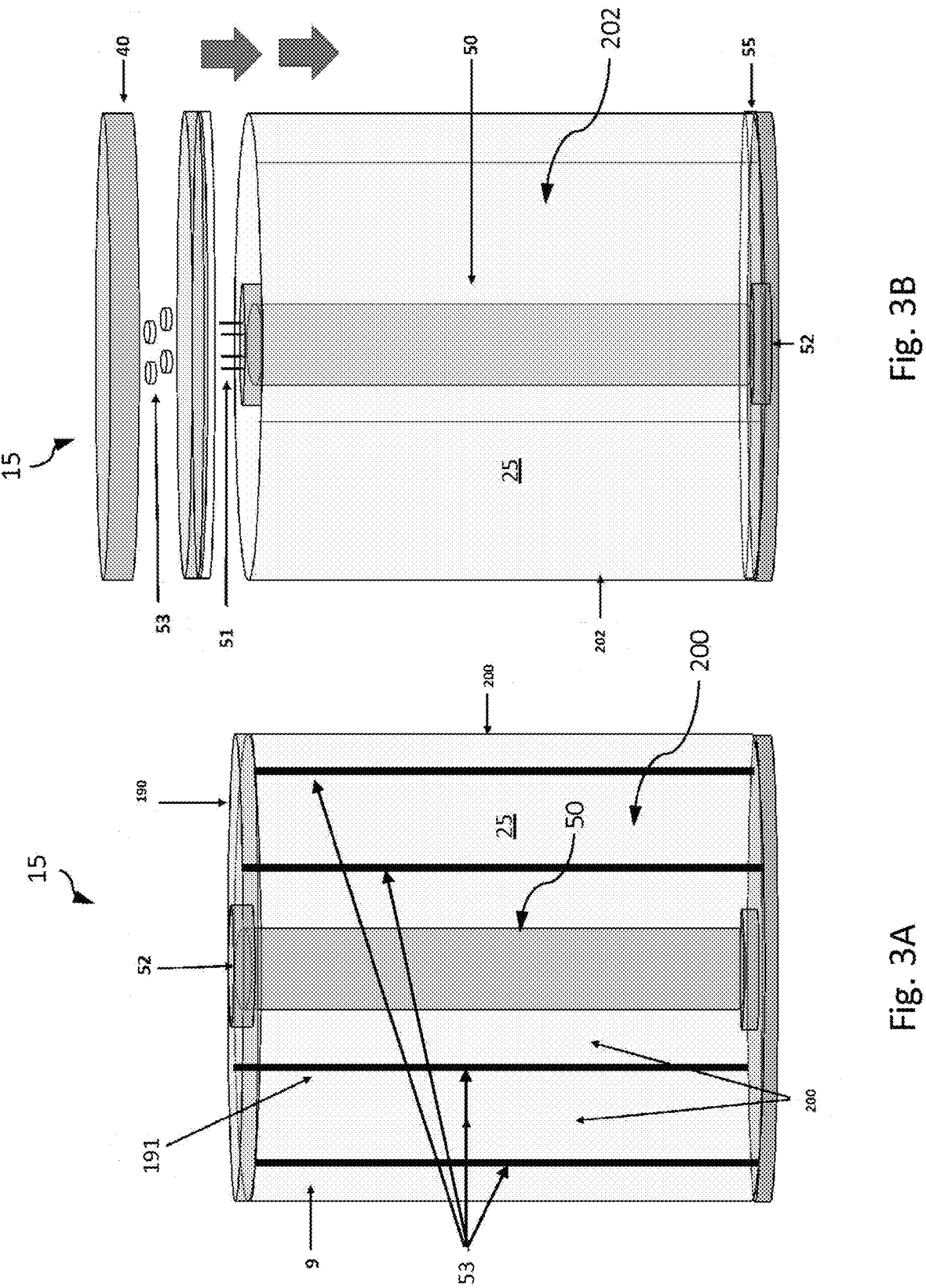
FIGS. 3A and 3B are perspective views illustrating certain aspects of a support frame of a tower according to the present disclosure at different stages of assembly.

The one or more peripheral members may be provided in a number of forms. As illustrated in FIG. 3A, the one or more peripheral members may comprise a plurality of vertically extending members 53 and a plurality of exterior panels 200 coupled therewith. The panels can be of LEXAN material, but other panel materials are encompassed by the invention. In the illustrated example, the upper frame horizontal shelf 55, the top cover assembly 40, the plurality of vertically extending members 53, and the plurality of exterior panels 200 are provided and configured in a generally circular or round form analogous to the corresponding generally circular or round forms of lower frame section 13 and the intermediated frame section 14 illustrated and described in connection with FIGS. 4 and 5. In other embodiments, the upper frame horizontal shelf 55, the top cover assembly 40, the plurality of vertically extending members 53, and the plurality of exterior panels 200 are provided and configured in a generally square or rectangular form analogous to the corresponding generally square or rectangular forms of lower frame section 13 and the intermediated frame section 14 illustrated and described in connection with FIGS. 4 and 5. Similarly, the alignment, orientation, and positioning of the plurality of vertically extending members 53 may correspond to the generally circular or round form or the generally square or rectangular forms of lower frame section 13 and the intermediated frame section 14 illustrated and described in connection with FIGS. 4 and 5

As illustrated in FIG. 3B and FIGS. 17-20, the one or more peripheral members may comprise a first peripheral member fixedly disposed intermediate the upper frame horizontal shelf and the top cover, for example, a first exterior panel 202 or an exterior panel with another shape or span. The one or more peripheral members may further comprise a second peripheral member removably disposed intermediate the upper frame horizontal shelf and the top cover, for example, a second exterior panel 203. In the illustrated example, the first exterior panel 202 extends about central post 50 over a range of 270 degrees+/−15 degrees and the second exterior panel 203 member extends about central post 50 over a range of 90 degrees+/−15 degrees. These ranges are preferred to balance the mass of the second exterior panel 203 while with accessibility to upper structure-free interior region 25. It shall be appreciated that other angle ranges may be selected depending on the mass and accessibility requirements of a given embodiment.

Figure 19:
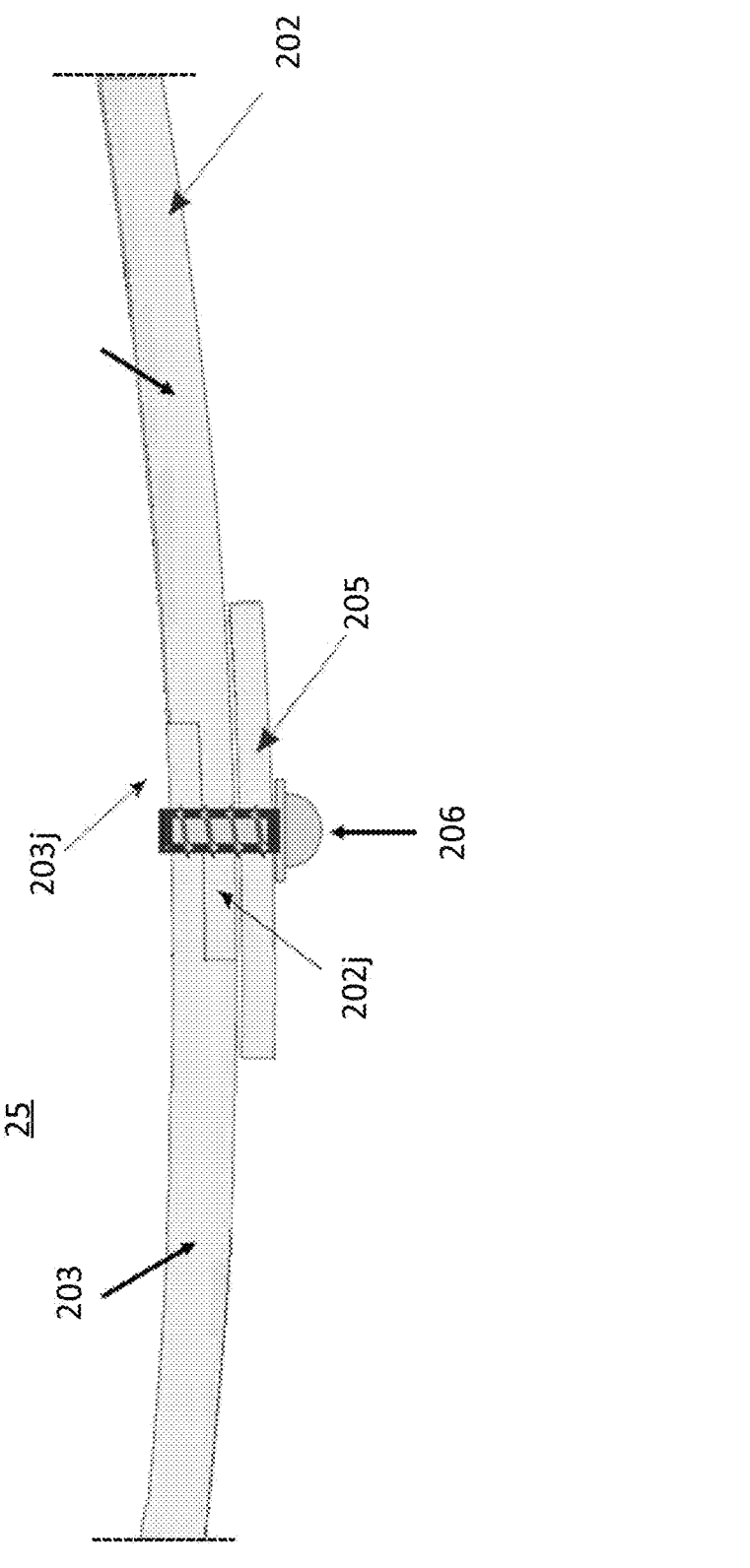
FIG. 19 is a detailed view of a portion of FIG. 18.

As illustrated in FIGS. 9A-9C, the exterior panels 200 may be secured in place by retention members 60 which are coupled with vertical members 53 by fasteners 211. Alternatively, as illustrated in FIG. 19, the first exterior panel 202 and the second exterior panel 203 may include respective mating junction portions 202j, 203j which may be provided as milled portions with a reduced radial thickness. The mating junction portions 202j, 203j may be coupled to one another by one or more cover members 205 and one or more fasteners 206.

Figure 18:
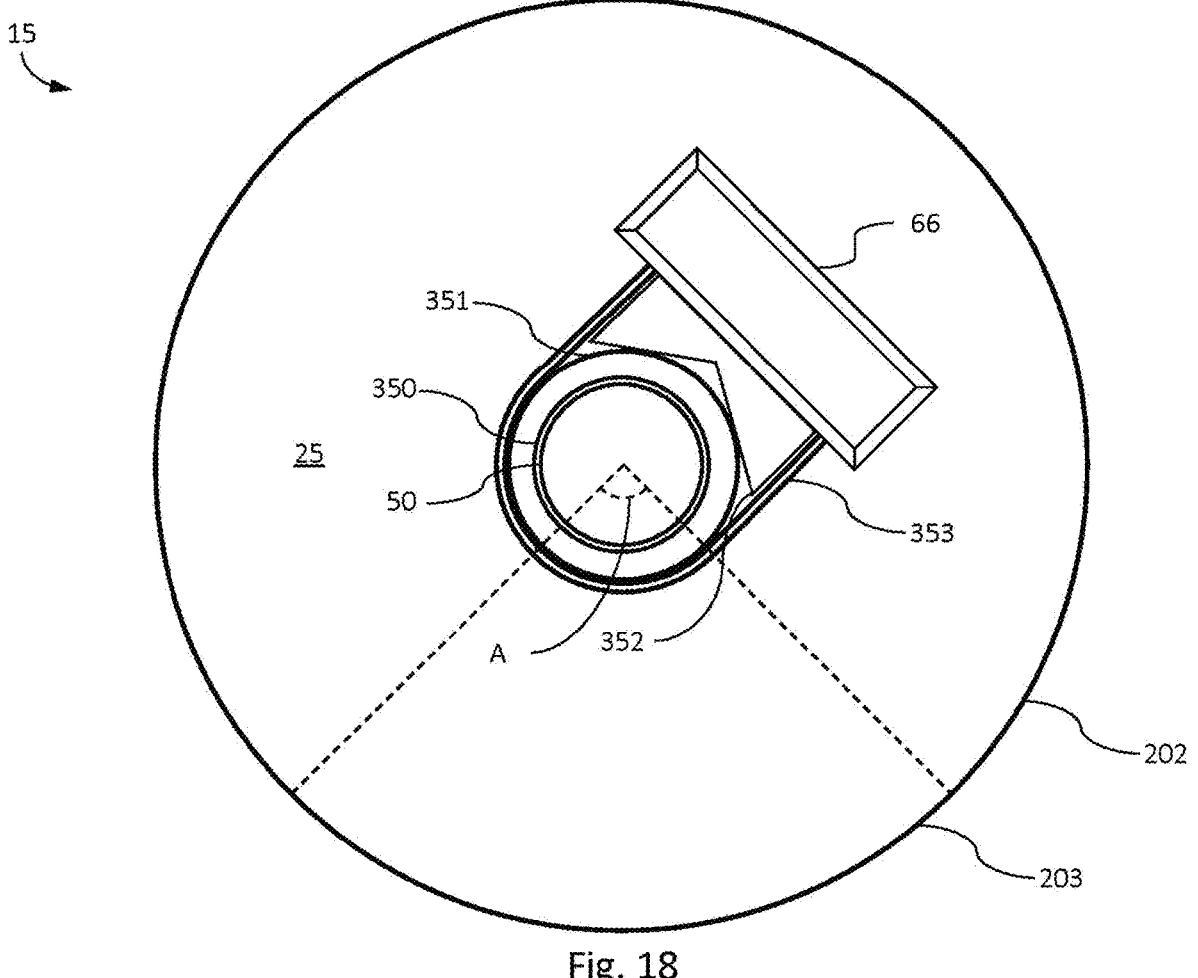
FIG. 18 is a top view illustrating certain aspects of a support frame of a tower according to the present disclosure.

As illustrated in FIG. 18, the upper frame section 15 includes a sleeve 350 positioned about and selectably rotatable relative to the central post 50. In the illustrated example, the sleeve 350 is configured as a tubular member or a cylinder with a hollow interior. The sleeve 350 may include or be coupled with a mounting ring 351 which provides a region of increased diameter that may be received by fasteners 352, 353 to fixedly couple one or more antennas 66 with the sleeve 350 such that the one or more antennas 66 and rotatable with the sleeve 350 relative to the central post 50.

Figure 20:
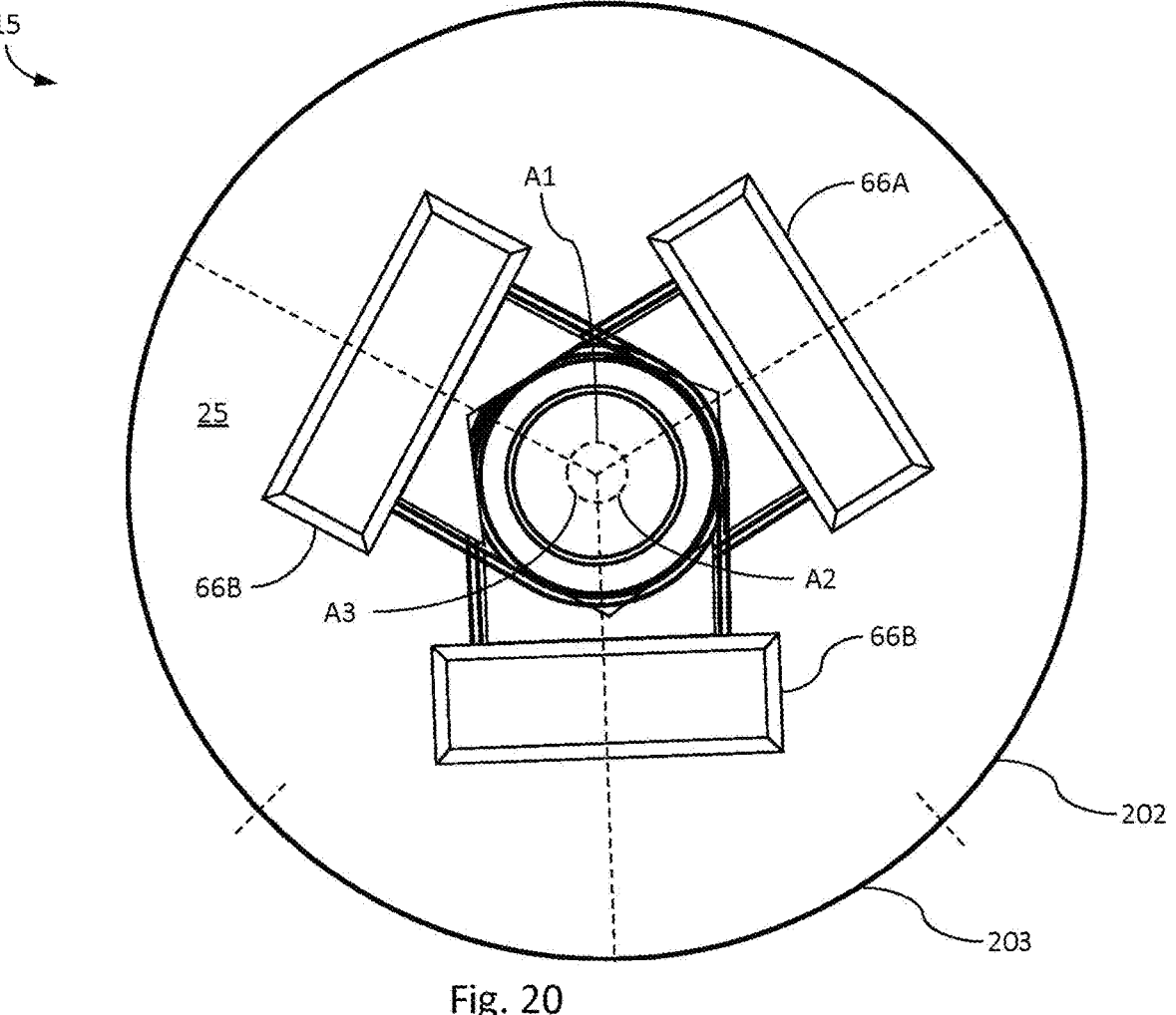
FIG. 20 is a top view illustrating certain aspects of an example antenna arrangement coupled with a support frame of a tower according to the present disclosure.

The one or more antennas 66 may comprise at least two antennas arranged in a sectorized relationship. As illustrated in FIG. 20, for example, the one or more antennas 66 comprise three antennas 66A, 66B, 66C arranged in a triangularly sectorized relationship such that the antennas are oriented at respective directions offset by angles A1, A2, A2 which may be equal to 120 degrees.

One or more fasteners (not illustrated) may be coupled with the sleeve 350 and adjustable between a first configuration wherein the sleeve is rotatable relative to the central post and a second configuration wherein the sleeve is rotationally fixed relative to the central post. The one or more fasteners comprise, for example, one or more set screws, pins, clamps, cams, or combinations thereof.

It shall be appreciated that the illustrated embodiments are examples in which at least one RF antenna 66, 66A-66C is contained in and occupies a portion of an upper structure-free interior region 25 as well as examples of embodiments wherein the at least one RF antenna 66, 66A-66C comprises the only radiating antenna.

Figures 6A, 6B, 6C, 6D, 6E:
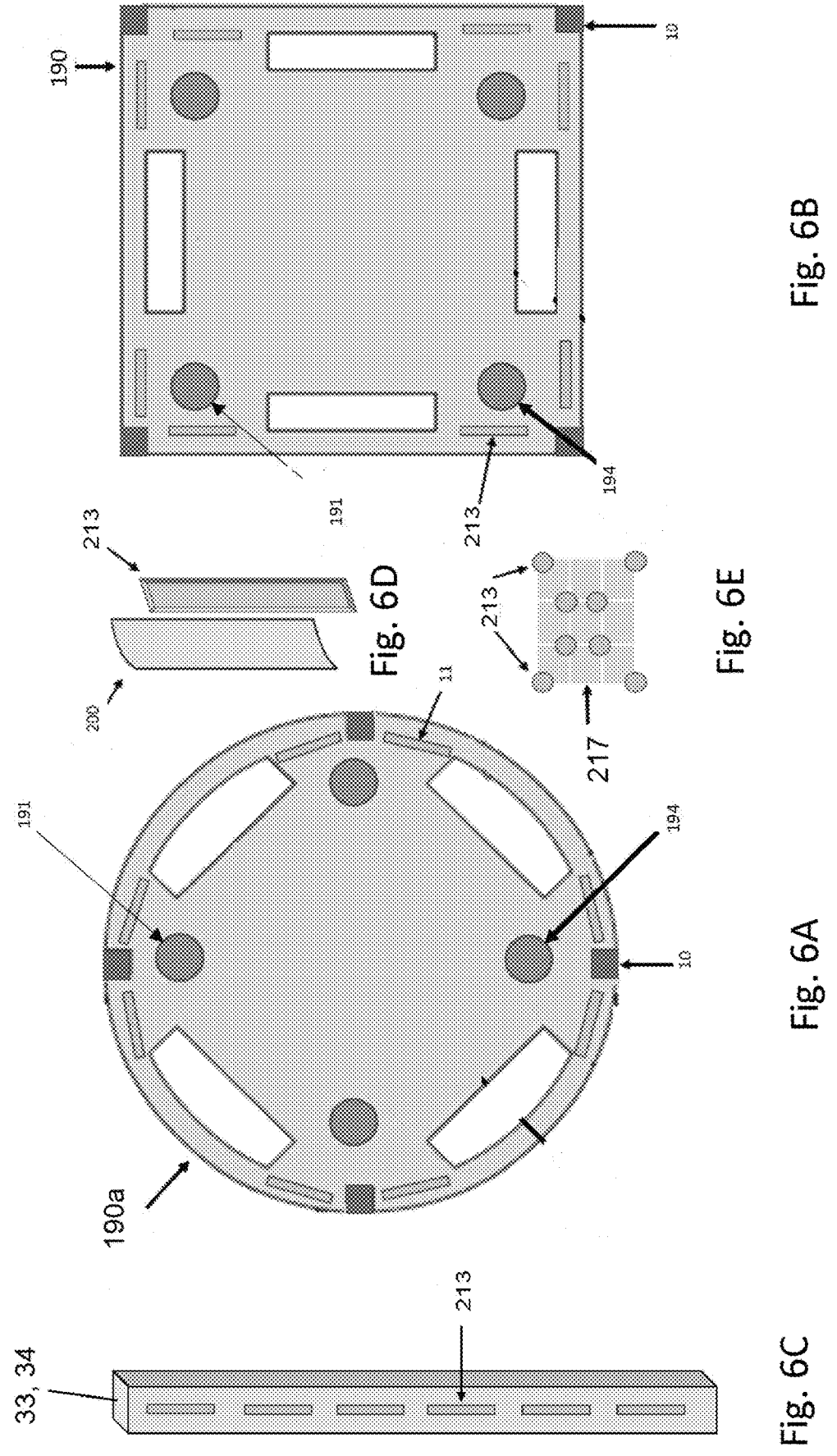
FIG. 6A-6E are several views illustrating certain aspects of example illumination systems useable in connection with a support frame of a tower according to the present disclosure.
Figures 10A, 10B, 10C, 10D, 10E, 10F:
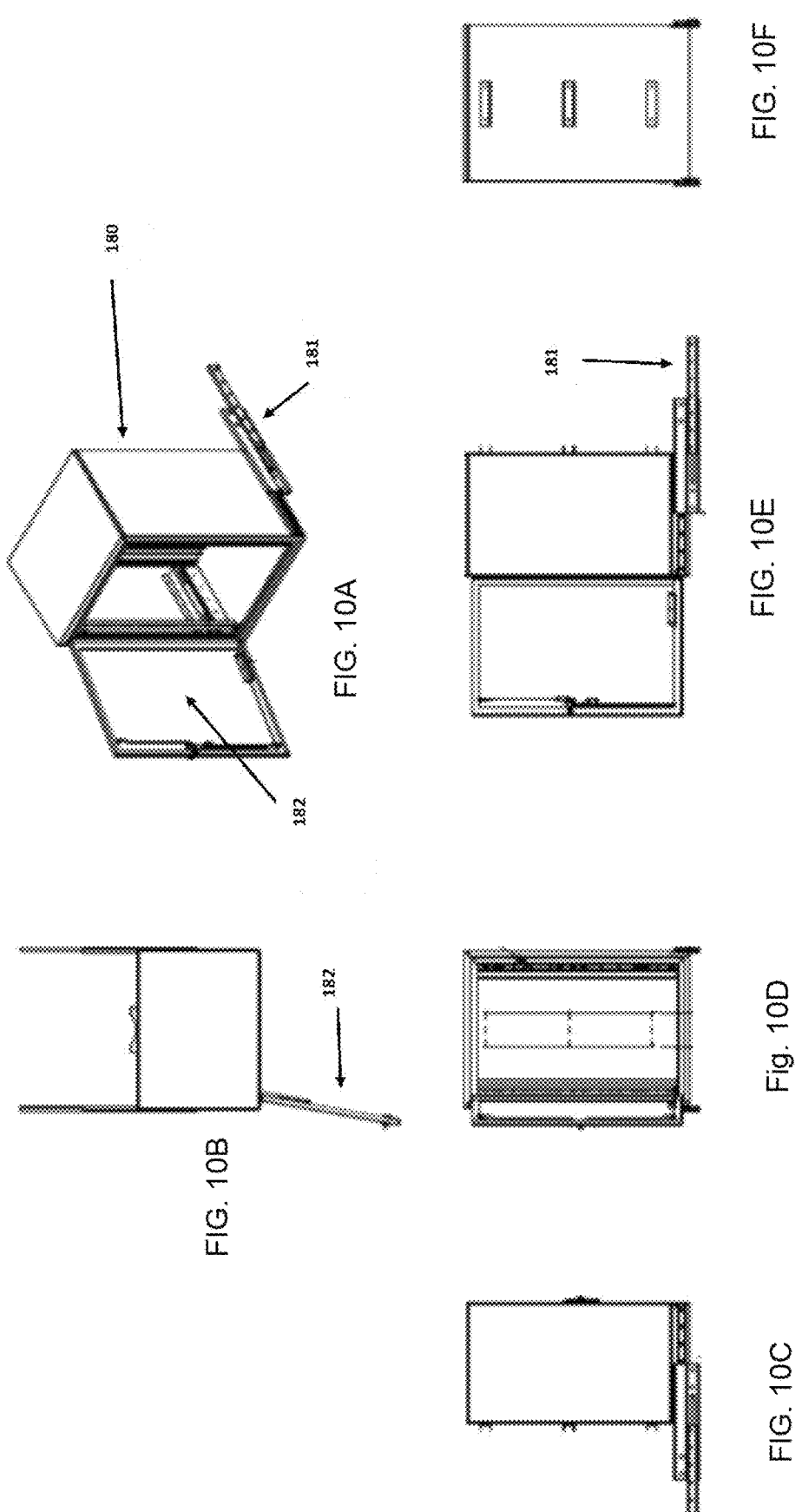
FIG. 10A is a perspective view of a cabinet enclosure with the cabinet enclosure door open, useable in connection with a support frame of a tower according to the present disclosure.
FIG. 10B is a top view of the cabinet enclosure of FIG. 10A with the cabinet enclosure door open.
FIG. 10C is a side view of the cabinet enclosure of FIG. 10A with the cabinet enclosure door closed.
FIG. 10D is a front view of the cabinet enclosure of FIG. 10A with the cabinet enclosure door open.
FIG. 10E is a side view of the cabinet enclosure of FIG. 10A with the cabinet enclosure door open.
FIG. 10F is a front view of the cabinet enclosure of FIG. 10A with the cabinet enclosure door closed.
Figure 11:
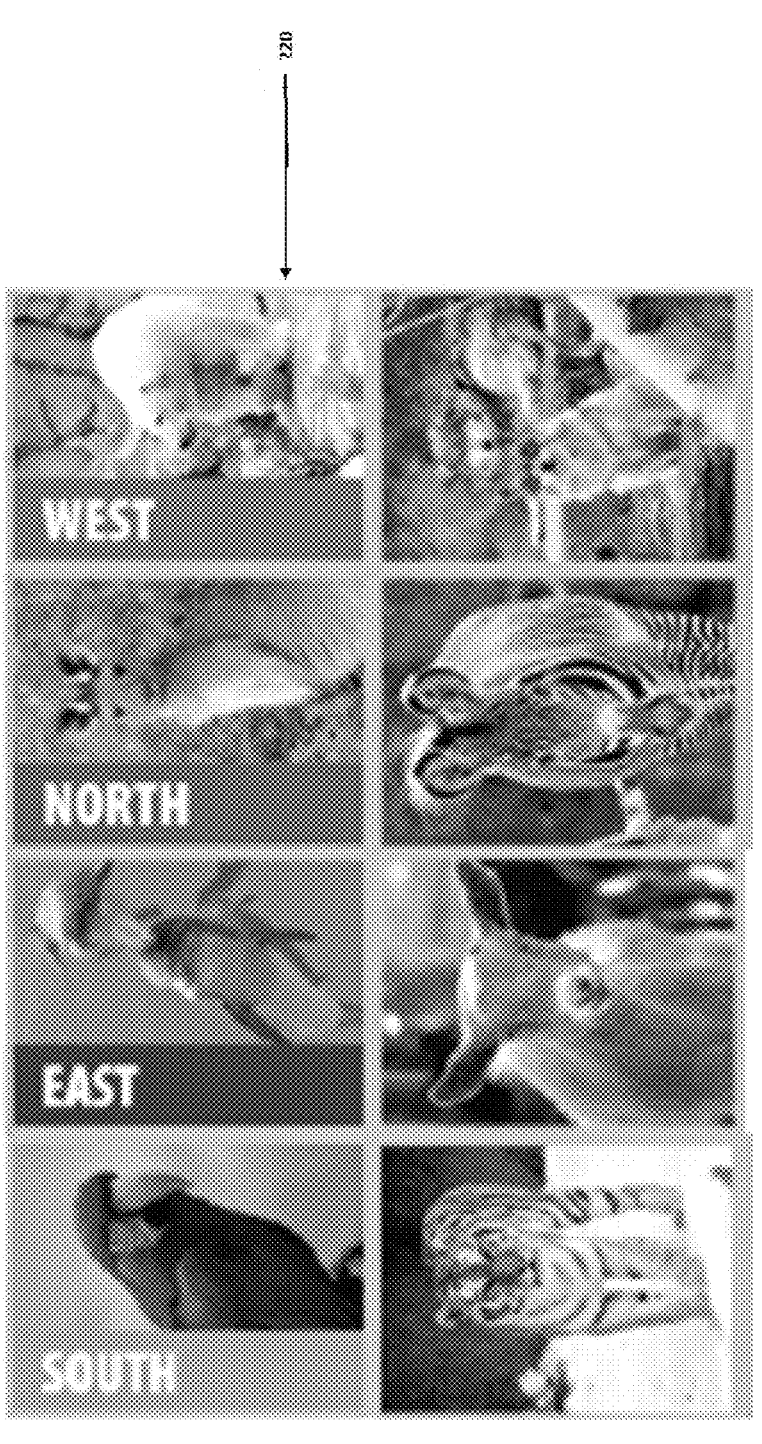
FIG. 11 illustrates an example of printed panels which may be utilized in connection with a support frame of a tower according to the present disclosure.
Figure 13:
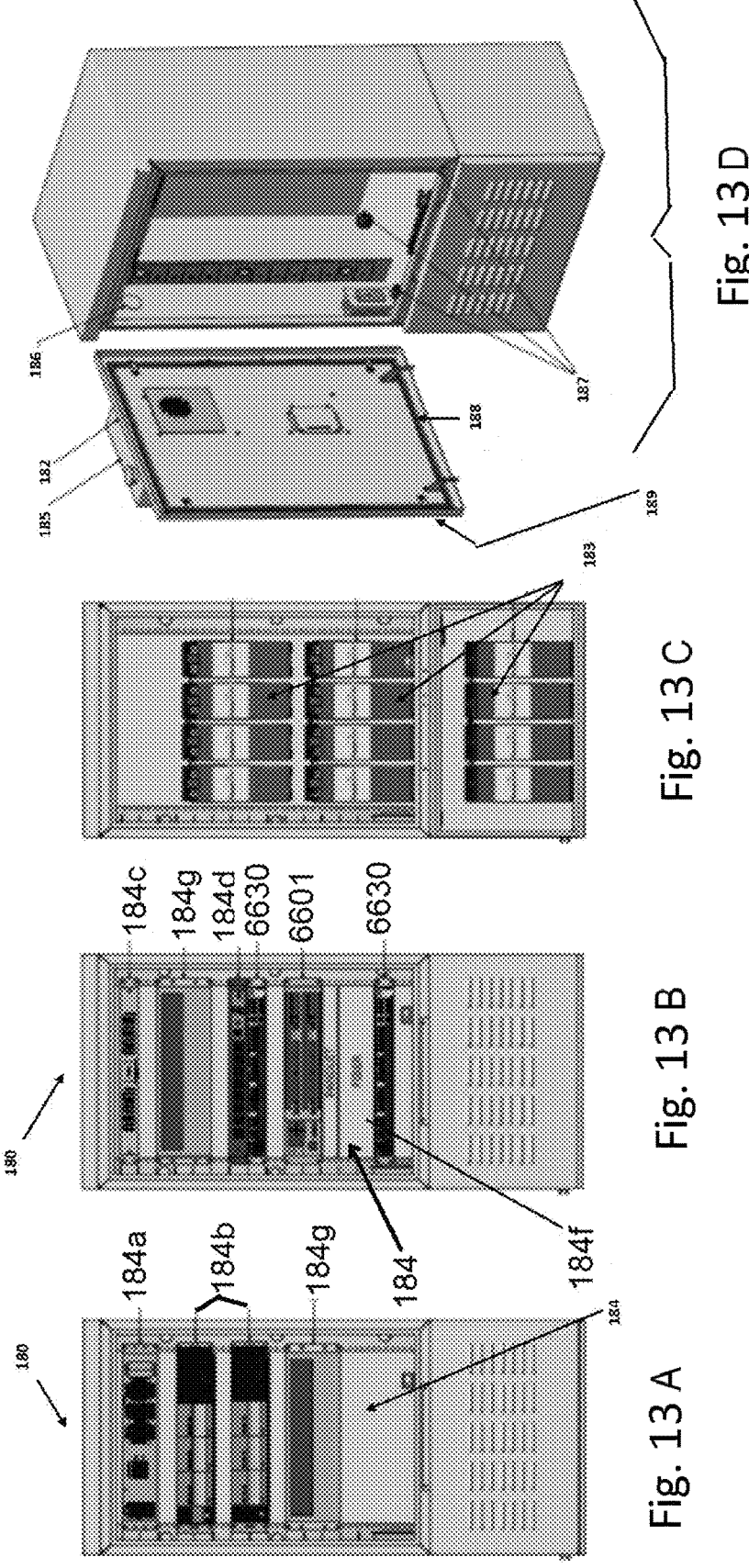
FIGS. 13A-13C illustrate several cabinet enclosures useable in connection with a support frame of a tower according to the present disclosure.
FIG. 13D is an exploded perspective view of a cabinet enclosure.
Figures 14A, 14B, 14C, 14D:
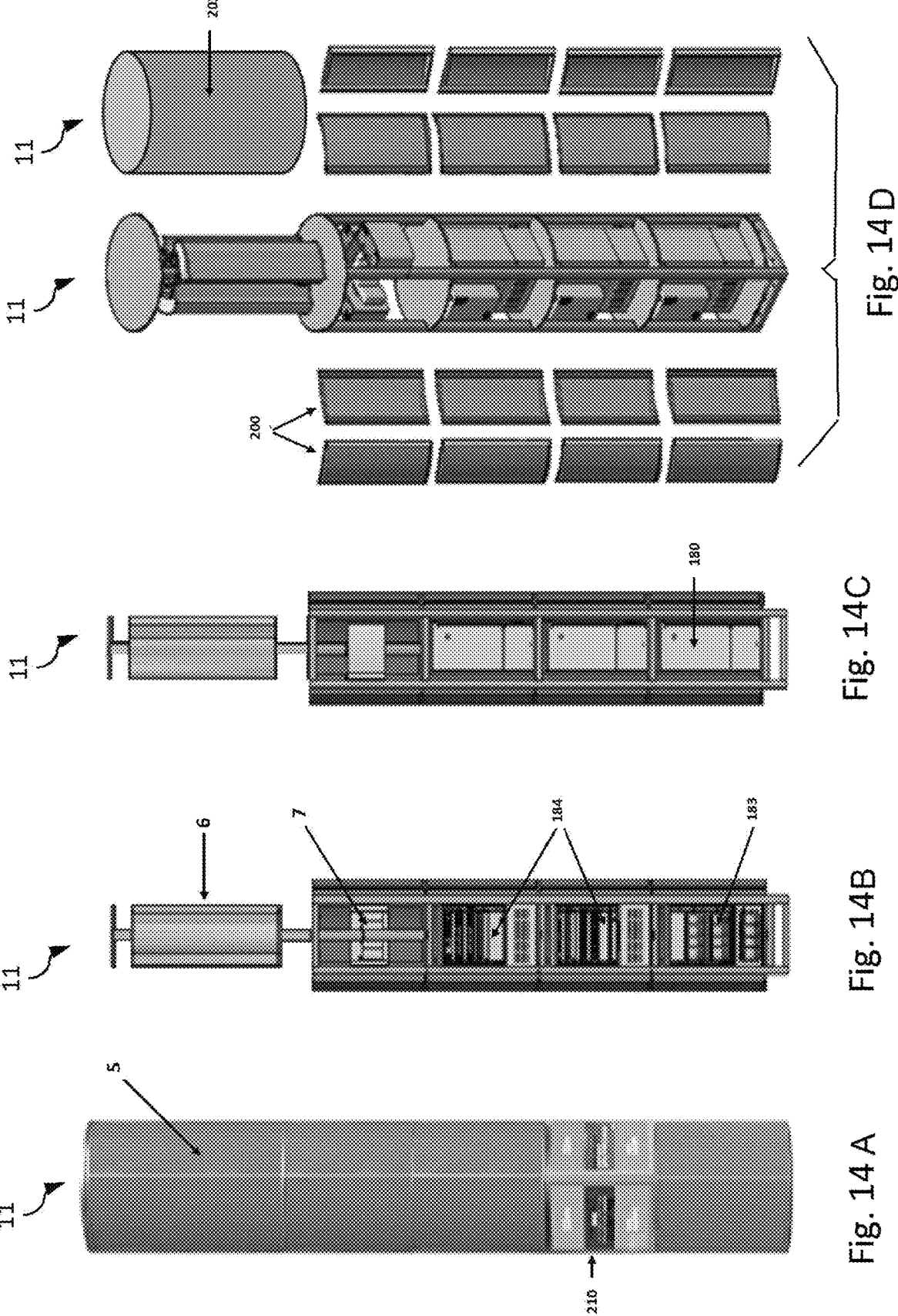
FIGS. 14A-14C illustrate several views of a tower according to the present disclosure at several states of assembly and loading with internal equipment.
FIG. 14D is an exploded perspective view of the tower.

With reference to FIGS. 6A-6E, there are illustrated several examples of LED lighting placement for illumination of the tower 11. As shown in FIGS. 6A and 6B, LEDs 213 may be placed on horizontal shelves 190a at locations intermediate the vent apertures and vertical frame members of a given level of the tower 11. As shown in FIG. 6C, LEDs 213 may be placed on vertical frame members, such as 33, 34, of the tower 11. As shown in FIG. 6D, LEDs 213 may be placed on or proximate a baffle which is configured to cover a portion of the tower 11. As shown in FIG. 6E, LEDs 213 may be placed on a mesh 217 which may be extended or suspended across the structure-free interior portion proximate the external panels. The example positioning of LEDs 213 may be effective to illuminate exterior panels provided with preprinted graphics and/or text as shown in FIG. 11. It shall be appreciated that such illumination systems may be utilized in connection with any of exterior panels 200, 202, 203, 240, 241, or other exterior panels herein. It shall likewise be appreciated that the various features described in connection with any one of exterior panels 200, 202, 203, 240, 241, or other exterior panels herein may likewise apply, mutatis mutandis, to any one of exterior panels 200, 202, 203, 240, 241, or other exterior panels, With additional reference to FIGS. 10-14, the tower 11 may be configured to house or contain a plurality of electronic subsystems. As shown in FIGS. 10, 13, and 14, and one or more environmentally sealed enclosures 180 (e.g., a NEMA enclosure) may be provided for insertion into structure-free interior compartments. The environmentally sealed enclosures 180 may include access doors 182 which may be secured by lock and key. The environmentally sealed enclosures 180 may be mounted on extensible slides 181. One or more of the environmentally sealed enclosures 180 may include power electronics 184 such as circuit breakers 184a, rectifiers 184b, fuse panels 184c, power strips 184d, power buses 184e, fiber-optic multiplexers 184f, overvoltage protectors 184g or other electronics. One or more of the environmentally sealed enclosures 180 may include battery systems 183 providing backup power. One or more of the environmentally sealed enclosures 180 may include a heat exchanger 185 disposed on access doors 182 as well sealing systems including gaskets 188 providing sealing of doors 182 with the environmentally sealed enclosures 180. One or more of the environmentally sealed enclosures 180 may also include telecommunications equipment 184. Other electronics such as antenna array 6, and amplifier or receiver system 7 may also be provided and housed or contained by the tower 11. In some embodiments, one or more weather-hardened electronics units (e.g., water-proof or water-resistant, freeze-thaw-proof or freeze-thaw resistant, humidity-proof or humidity resistant) may be utilized in addition to or as an alternative to environmentally sealed enclosures. One or more knock outs 186, 187 can be provided for cable feed as needed.

Figure 12:
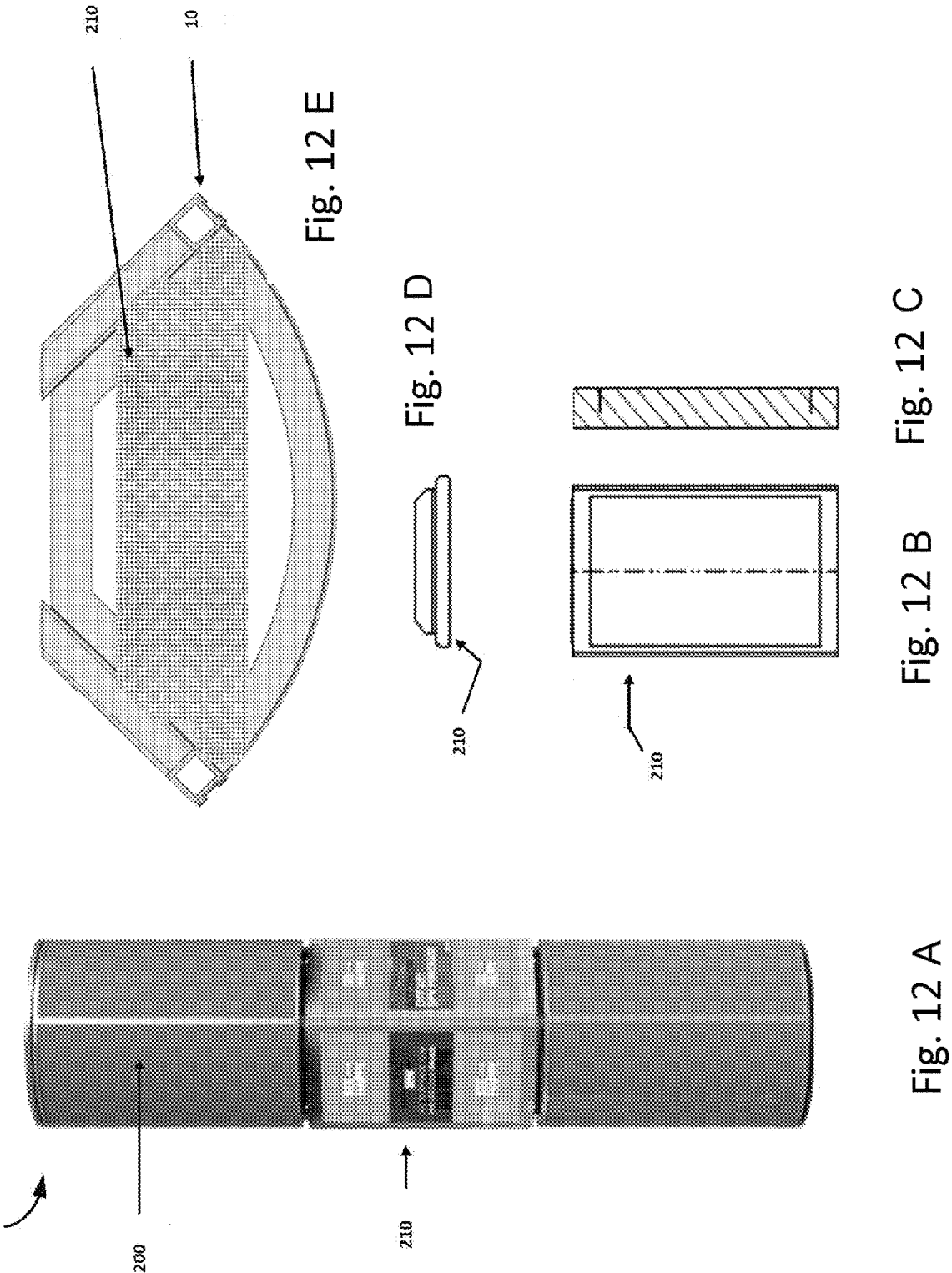
FIG. 12A is a perspective view of a tower with a display screen useable in connection with a support frame of a tower according to the present disclosure.
FIG. 12B is an elevational view of a display screen from FIG. 12A.
FIG. 12C is a side view of the display screen of FIG. 12B.
FIG. 12D is a top view of the display screen of FIG. 12B.
FIG. 12E is a top view of another tower with a display screen.

As shown in FIG. 12, one or more display screens 210 may be provided and exposed to the exterior of the tower 11. For example, one or more of the plurality of intermediate frame sections 14 includes a plurality of user interface screens 210, at least one of the plurality of user interface screens being visible from any position about the support frame.

Figure 15:
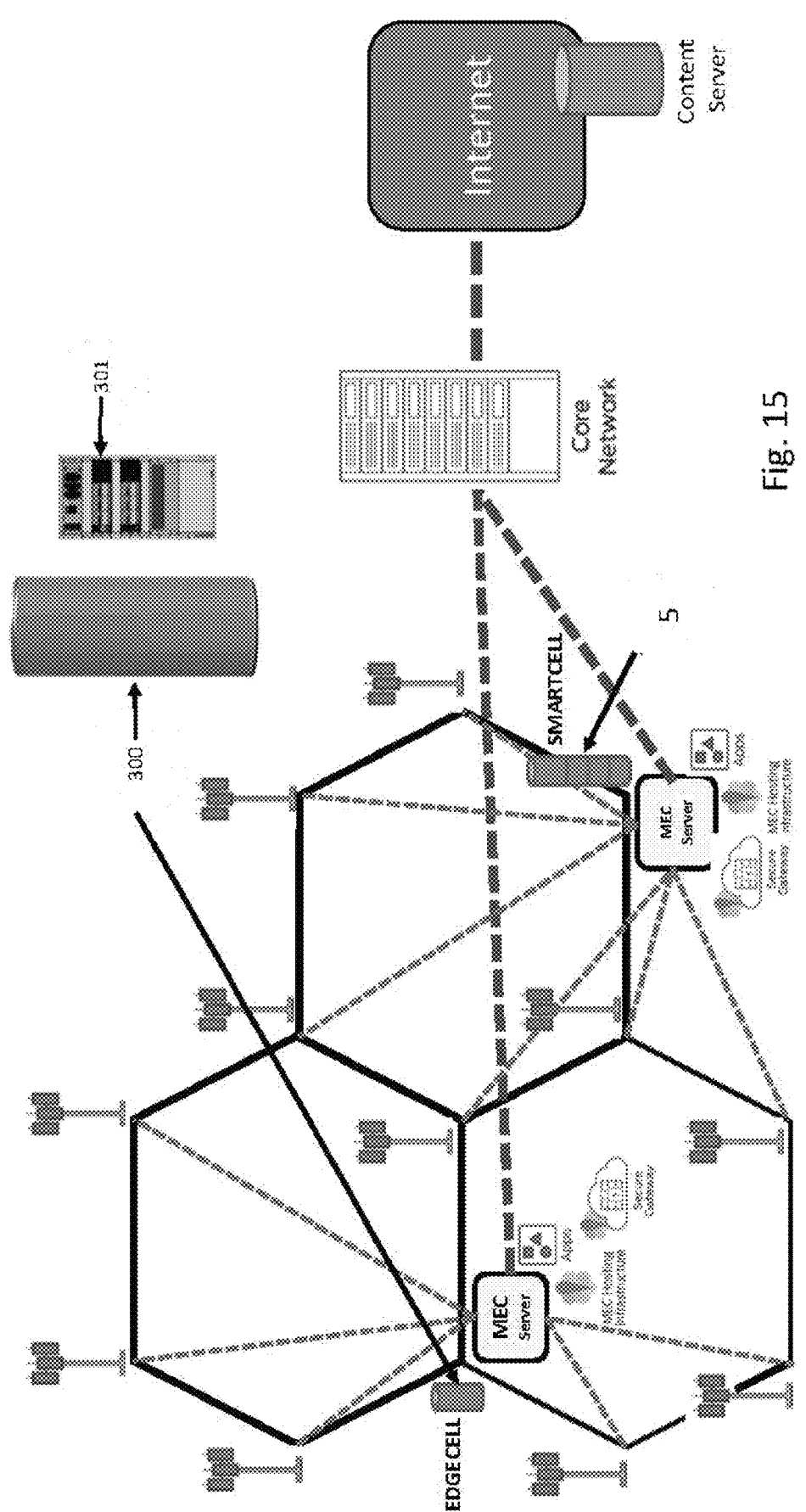
FIG. 15 is a schematic diagram illustrating an example of a micro-mobile edge computing system architecture useable in connection with a tower according to the present disclosure.
Figure 16:
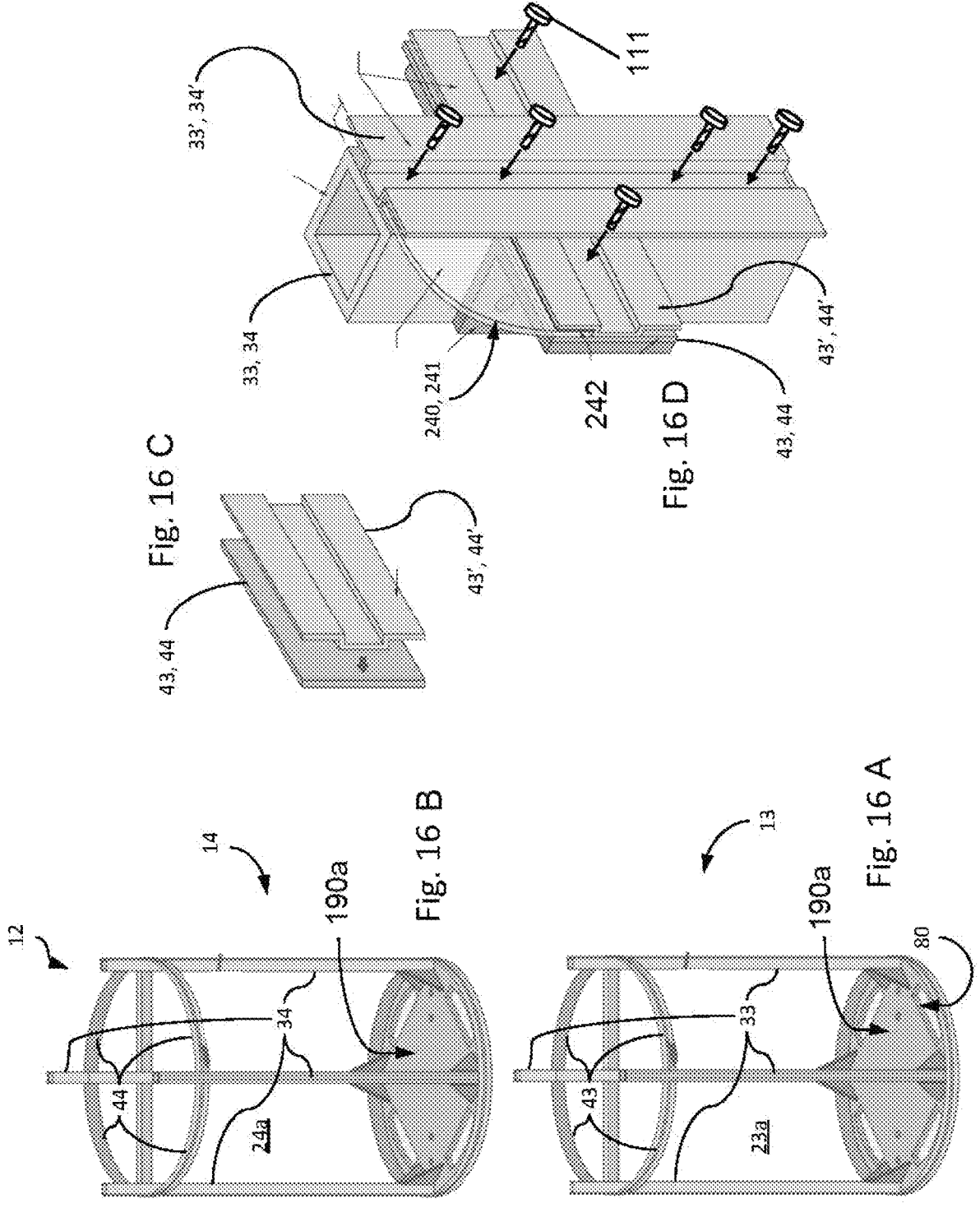
FIG. 16A is a perspective view of a lower support frame according to the present disclosure.
FIG. 16B is a perspective view of an upper support frame according to the present disclosure.
FIG. 16C is a fragmentary perspective view of a portion of a panel attachment configuration.
FIG. 16D is a fragmentary perspective view of a portion of a panel attachment configuration on a vertical column.
Figure 17:
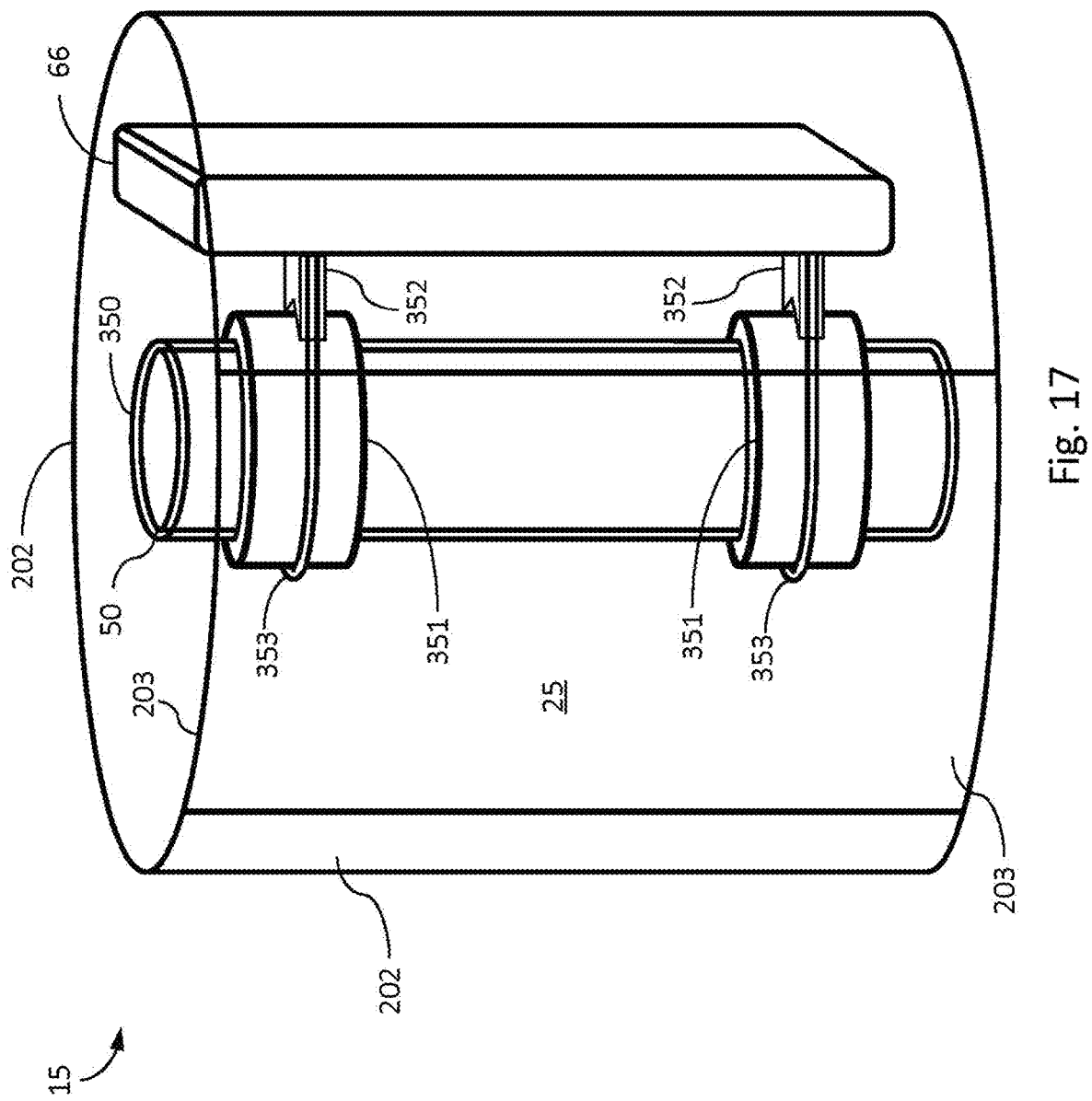
FIG. 17 is a perspective view illustrating certain aspects of a support frame of a tower according to the present disclosure.

With additional reference to FIG. 15, the one or more of the plurality of intermediate frame sections may include a computing system 301 configured and operable as an edge network computing system, in addition to or an alternative to the computing systems configured and operable as a mobile network cell. In some embodiments, at least one of the plurality of intermediate frame sections includes a computing system configured and operable as an edge network computing system, and at least one of the plurality of intermediate frame sections includes a computing system configured and operable as a mobile network cell comprise the same computing system. In some embodiments, at least one of the plurality of intermediate frame sections includes a computing system configured and operable as an edge network computing system and the at least one of the plurality of intermediate frame sections includes a computing system configured and operable as a mobile network cell comprise separate computing systems. Thus, it shall be appreciated that multiple instances of the tower 11 may be utilized in a telecommunications system wherein one or more of the towers 11 are configured to provide an edge computing functionality as well as cellular or mobile network functionality, and one or more of the towers 11 may be configured to provide as cellular or mobile network functionality. Furthermore, the towers 11 may be integrated into a telecommunications system including other small cell and macro cell sites.

From the description of the illustrated embodiments, it shall be appreciated that the apparatuses, methods, and systems according to the present disclosure provide for integration and improvement of multiple functionalities, including cellular or mobile communication infrastructure, edge computing, and/or interactive information kiosks. Some such embodiments are suitable for implementation at street level and in areas of high foot traffic. Some such embodiments provide greater connectivity as they are closer to the public thus reducing latency as they are connected with direct internet access, for example, via underground fiber cables. It shall be further appreciated that apparatuses, methods, and systems according to the present disclosure may be utilized to house a number of cell site elements in close proximity to the edge of the network providing an improved system which merges these functions into a single platform without the requirement to replace or overhaul currently deployed appliances or systems. It shall be further appreciated that apparatuses, methods, and systems according to the present disclosure may provide aesthetically pleasing communication infrastructure suitable for downtown areas, historical districts, neighborhoods and other venues where structures deployed must blend into the environment deployed as to match the surroundings.

According to some example embodiments, a tower including an aggregation point housed on or within the tower may be provided. The tower can incorporate cellular radios, cellular edge network connectivity, environmental and other sensors, Wi-Fi access points, LCD interactive screens, surveillance cameras, etc. Such towers may be used to replace separate LTE, 5G and smart city solutions with a singular integrated unit. Such towers may be used to provide a multifaceted apparatus which establishes the fundamental elements of a mobile communications network node enhanced with smart city features. For example, as a mobile communications network carriers can utilize a variety of cellular technology solutions such as macro, mini, micro, small cell equipment with antennas mounted at, or near, the highest point of the tower through which a cellular and Wi-Fi signal may be maintained for voice and data for longer distances with the enhancement of power backup and data capacity. Additionally, the mobile communications network can be coupled with smart city applications allowing for cellular and Wi-Fi communications in a variety of ways including, but not limited to, Internet access, phone calls, security monitoring, urban way-finding, providing environmental sensor information to the city's utilities, and other smart city applications.

According to some example embodiments, a tower may comprise modular housing units of varying sizes fitted into the space created by a modular frame architecture and methodology. The tower may be of a modular construction allow for additional housing units to be added or subtracted to increase or decrease the height of the tower based on the capacity requirements and services sought. The tower may be configured to allow for the increase or decrease of the footprint of the equipment mounted on the structure with a simple increase or decrease of the size of the structure supporting poles.

According to some example embodiments, a tower can receive and house cellular carrier equipment at a vertical level designated with specific technical functionality, within a housing unit, based on the type of cellular node deployed at the specific location (e.g. macro, micro, mini, small cell, etc.). Some such forms allow for the deployment of environmentally controlled and secured NEMA enclosures in the event a cellular carrier would like to increase capacity by upgrading their equipment to configurations similar to the traditional macro site deployments or increase the power from a small cell to a medium cell power and larger antennas thus increasing the coverage area served. Upper compartments containing radiating elements such as antennas can be varied in size based on the frequency and length of the antenna radiating elements.

According to some example embodiments, a tower can be configured in a multiplicity of methods and architectures to serve as an edge networking facility for a cellular network. Some or all space inside the tower could be converted to appropriately include Radio radiating elements, baseband radio systems, and/or data networking and edge processing equipment. In some forms, three of the aforementioned housing units can be substantially identical in dimensions and can be arranged in any order. An interactive kiosk could be self-operational or dependent on computer elements within the tower or the integrated LCD structure. Monitoring functions for radio and all associated equipment can also be accomplished locally or operated remotely. As a result, the tower could be built vertically in a modular building block fashion allowing for space availability to increase or decrease.

According to some example embodiments, a tower can include multiple housing units or levels and each of the housing units or levels can be fitted with removable side panels providing 360-degree access to the equipment mounted on the shelf (level). In some forms, one or more of the side panels can be removed or otherwise opened to allow for access from all sides, used to assist in quick installations and maintenance instances. One or more side panels, front and/or the back panels can be replaced by LCD display screen(s). It is also possible to install LCD or similar displays on all four sides of the tower to provide guidance and information to foot or vehicular traffic.

According to some example embodiments, a self-standing tower may be mounted into a cement base built to the structure's diameter or size footprint. In various forms, square, oval, rectangular, or round designs can be deployed with the same support frame of four vertical members.

According to some example embodiments, a tower may include cellular and Wi-Fi antennas mounted at the highest point of a tower, allowing for improved signal propagation and fewer obstructions of line-of-sight. The tower may be configured to have a greater height than other potential installation sites such as existing street pole or utility pole installations and may allow for added range and coverage. The tower can accommodate connections such as commercial power or fiber-optics fitted from beneath the tower. All power and fiber can be trenched underground to each location and would run throughout the tower itself.

According to some example embodiments, a wireless base station may include a combination of two or more of cellular network equipment, edge computing equipment, an interactive kiosk, surveillance cameras, Wi-Fi access point, fired gun detectors, and environmental sensors in a single platform, and/or a tower.

In some embodiments, a multi-purpose tower may be integrated with an interactive screen, may provide an aggregation node to direct and accept traffic to specified end points within the tower or to outside resources; may provide an enclosure containing components supporting a multifunctional purpose; may provide an enclosure with removable access panels at every direction; may provide access to the interactive screen components; may be configured with an internal pole at the top level of the platform or any other level to solidify the mounting of electronic components or antennas and aid in the structural integrity of the tower; may be coupled with commercial power, fiber optics connections and proposed distribution running through the space provided within the interior of the tower; may include a macro/mini/micro/small cell antenna on the top section conforming to existing small cell/micro/mini/Macro products; may provide a macro/mini/micro/small cell functionality with a Wi-Fi access point via a managed switch residing inside the platform; may provide network a macro/mini/micro/small cell with a fiber optics circuit via a managed switch within the platform; or may provide a combination of two or more of the foregoing features.

In some embodiments, a multi-purpose tower may network a macro/mini/micro/small cell with a point-to-point radio via a managed switch within the platform, may network a macro/mini/micro/small cell with a surveillance camera via a managed switch residing inside the platform; may network a macro/mini/micro/small cell with smart city sensors via a managed switch within the platform; may network the Wi-Fi access point with a fiber optics circuit via a managed switch residing inside the platform; may network the Wi-Fi access point with a fast Ethernet network via a managed switch residing inside the platform; may network the Wi-Fi access point with a surveillance camera via a managed switch residing inside the platform; may network the Wi-Fi access point with a Point-to-Point radio via a managed switch residing inside the platform; may network the environmental sensors with a fiber optics circuit via a managed switch residing inside the platform; may network the environmental sensors with a fast Ethernet network via a managed switch residing inside the tower platform; may network environmental sensors with a Point-to-Point radio via a managed switch residing inside the tower platform; may network all smart node elements via a managed switch within the tower platform; or may provide a combination of two or more of the foregoing features. The networking protocol or techniques may use currently available VLAN or OSPF techniques or future networking protocol methods.

In some embodiments, a multi-purpose tower may direct local network traffic into the fiber optics circuit originating from a surveillance camera and directing traffic via a small cell for monitoring; may direct network traffic into a fast Ethernet network originating from a surveillance camera and directing traffic via the small cell for monitoring; may direct network traffic into the Point-to-Point microwave network originating from a surveillance camera and directing traffic via the small cell for monitoring, utilizing a managed switch within the tower platform; may direct network traffic into the small cell originating from environmental sensor data via a managed switch within the tower platform; may direct local network traffic into the Wi-Fi network originating from environmental sensor data via a managed switch within the tower platform; may direct local network traffic into the Point-to-Point microwave network originating from environmental sensor data via a managed switch within the tower platform; or may provide a combination of two or more of the foregoing features.

In some embodiments, a multi-purpose tower may comprise modular or segmented housing units that can be stacked on top of one another in the creation of a singular structure; may be environmentally controlled; may include a structural skeletal frame or scaffolding enclosed by exterior panels; may include modular or segmented housing units securely connected to one another in a stacked arrangement; may include modular or segmented housing units can be added or subtracted to the structure as necessary; may include modular or segmented housing units can be added or subtracted to accommodate equipment needs; may be deployed as a resource in two or more configurations; or may provide a combination of two or more of the foregoing features.

Some embodiments provide a multi-purpose tower that is modular and configurable to the needs of the wireless carriers allows the platform to be configured in a multiplicity of configurations before or after initial deployment. For example, the tower can be converted from containing radiating elements like antennas to a smart tower containing only networking, edge computing and radio elements.

While example embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. An apparatus comprising:
a support frame comprising a lower frame section, at least one intermediate frame section positioned vertically above and supported by the lower frame section, and an upper frame section positioned vertically above and supported by the at least one intermediate frame section, wherein:

the lower frame section defines a lower structure-free interior compartment horizontally spanning the lower frame section,
each of the at least one intermediate frame section defining an intermediate structure-free interior compartment horizontally spanning the intermediate frame section, and
the upper frame section includes an upper frame horizontal shelf, a central post coupled with and extending vertically upward from the upper frame horizontal shelf, a top cover coupled with the central post, and one or more peripheral members extending between the upper frame horizontal shelf and the top cover, the upper frame section defining an upper structure-free interior region extending between the central post and the one or more peripheral members.

2. The apparatus of claim 1, wherein at least one of:
the lower frame section comprises a first polygonal frame module including a first plurality of open-aperture faces providing unobstructed access to the lower structure-free interior compartment, and
the at least one intermediate frame section comprises at least one second polygonal frame module including a second plurality of open-aperture faces providing unobstructed access to the intermediate structure-free interior compartment.

3. The apparatus of claim 2, wherein one or both of:
the first polygonal frame module and the at least one second polygonal frame module are provided as discrete structures configured to selectably and reversibly fasten and unfasten from one another, and
the first polygonal frame module and the at least one second polygonal frame module are provided as a common discrete structure.

4. The apparatus of claim 3, wherein one or more of:
(a) the first polygonal frame module and the at least one second polygonal frame module respectively comprise a male mating structure and a female mating structure,
(b) the first polygonal frame module and the at least one second polygonal frame module are welded to one another, and
(c) the first polygonal frame module and the at least one second polygonal frame module are coupled with one another by strength-bearing screws.

5. The apparatus of claim 3, wherein two or more of:
(a) the first polygonal frame module and the at least one second polygonal frame module respectively comprise a male mating structure and a female mating structure,
(b) the first polygonal frame module and the at least one second polygonal frame module are welded to one another, and
(c) the first polygonal frame module and the at least one second polygonal frame module are coupled with one another by strength-bearing screws.

6. The apparatus of claim 1, comprising a plurality of solid exterior panels extending over and at least partially covering one or more of the lower frame section, the at least one intermediate frame section, and the upper frame section.

7. The apparatus of claim 6, wherein the plurality of solid exterior panels comprises a substantially round arrangement of panels.

8. The apparatus of claim 1, wherein the upper frame section includes a sleeve positioned about and selectably rotatable relative to the central post.

9. The apparatus of claim 8, wherein the sleeve is configured as a cylinder with a hollow interior.

10. The apparatus of claim 8, wherein one or more antennas are fixedly coupled with the sleeve and rotatable with the sleeve relative to the central post.

11. The apparatus of claim 10 wherein the one or more antennas comprise at least two antennas arranged in a sectorized relationship.

12. The apparatus of claim 10 wherein the one or more antennas comprise three antennas arranged in a triangularly sectorized relationship.

13. The apparatus of claim 8, comprising one or more fasteners coupled with the sleeve and adjustable between a first configuration wherein the sleeve is rotatable relative to the central post and a second configuration wherein the sleeve is rotationally fixed relative to the central post.

14. An apparatus comprising:
a support frame comprising a lower frame section, at least one intermediate frame section positioned vertically above and supported by the lower frame section, and an upper frame section positioned vertically above and supported by the at least one intermediate frame section, wherein:
the lower frame section defines a lower structure-free interior compartment horizontally spanning the lower frame section,
each of the at least one intermediate frame section defining an intermediate structure-free interior compartment horizontally spanning the intermediate frame section, and
the upper frame section includes an upper frame horizontal shelf, a central post coupled with and extending vertically upward from the upper frame horizontal shelf, a top cover coupled with the central post, and one or more peripheral members extending between the upper frame horizontal shelf and the top cover, the upper frame section defining an upper structure-free interior region extending between the central post and the one or more peripheral members;
wherein the lower frame section comprises a first plurality of vertical columns, a first plurality of horizontal beams coupled with and extending between respective ones of the first plurality of vertical columns, a first horizontal shelf supported by one or more of the first plurality of horizontal beams and extending between the first plurality of vertical columns, wherein the structure-free interior compartment is bordered by and extends horizontally between the first plurality of vertical columns.

15. The apparatus of claim 14, wherein the lower frame section comprises a base plate supporting the first plurality of vertical columns, the first plurality of horizontal beams, and the first horizontal shelf, the base plate including a first plurality of apertures sized and positioned to receive ground anchor bolts and one or more second apertures sized and positioned to receive one or both of an electrical power cable and a network communication line.

16. The apparatus of claim 14, wherein the first horizontal shelf and the first plurality of horizontal beams are positionable at a first plurality of vertical fixation locations along the first plurality of vertical columns.

17. The apparatus of claim 14, wherein the at least one intermediate frame section comprises a second plurality of vertical columns, a second plurality of horizontal beams coupled with and extending between respective ones of the second plurality of vertical columns, and a second horizontal shelf supported by one or more of the second plurality of horizontal beams and extending between the second plurality of vertical columns, wherein the intermediate structure-free interior compartment is bordered by and extends horizontally between the second plurality of vertical columns.

18. The apparatus of claim 17, wherein the second horizontal shelf and the second plurality of horizontal beams are positionable at a second plurality of vertical fixation locations along the second plurality of vertical columns.

19. The apparatus of claim 17, wherein at least one of:
the first plurality of vertical columns comprises four vertical columns arranged such that an inward facing surface of each of the four vertical columns intersects a respective corner of a rectangle with sides extending between respective pairs of the four vertical columns; and
the second plurality of vertical columns comprises four vertical columns arranged such that an inward facing surface of each of the four vertical columns intersects a respective corner of a rectangle with sides extending between respective pairs of the four vertical columns.

20. The apparatus of claim 19, wherein at least one of:
the inward facing surface of a first one of the first plurality of vertical columns is parallel with and faces the inward facing surface of a second one of the first plurality of vertical columns, and the inward facing surface of a third one of the first plurality of vertical columns is parallel with and faces the inward facing surface of a fourth one of the first plurality of vertical columns; and
the inward facing surface of a first one of the second plurality of vertical columns is parallel with and faces the inward facing surface of a second one of the second plurality of vertical columns, and the inward facing surface of a third one of the second plurality of vertical columns is parallel with and faces the inward facing surface of a fourth one of the second plurality of vertical columns.

21. A telecommunications tower comprising:
a scaffold frame comprising a plurality of vertical frame portions extending vertically along respective vertical frame axes positioned radially outward from a scaffold frame axis, the plurality of vertical frame portions bounding an interior space extending radially inward from the respective vertical frame axes toward the scaffold frame axis, and a plurality of horizontal frame portions extending horizontally between and interconnecting the plurality of vertical frame portions;
a plurality of shelves coupled with the scaffold frame and extending horizontally on respective horizontal shelf planes, the plurality of shelves dividing the interior space into a plurality of vertically arranged compartments, a first one of the plurality of compartments containing an antenna, a second one of the plurality of compartments positioned vertically below first one of the plurality of compartments containing a radio communications component communicatively coupled with the antenna; and
a plurality of exterior panels coupled with the scaffold frame and covering the plurality of compartments.

* * * * *